(12) United States Patent
Ohnishi

(10) Patent No.: US 10,343,416 B2
(45) Date of Patent: Jul. 9, 2019

(54) PRINTER AND PRINTING METHOD

(71) Applicant: MIMAKI ENGINEERING CO., LTD., Nagano (JP)

(72) Inventor: Masaru Ohnishi, Nagano (JP)

(73) Assignee: MIMAKI ENGINEERING CO., LTD., Nagano (JP)

( * ) Notice: Subject to any disclaimer, the term of this patent is extended or adjusted under 35 U.S.C. 154(b) by 0 days.

(21) Appl. No.: 15/788,807

(22) Filed: Oct. 20, 2017

(65) Prior Publication Data

US 2018/0111389 A1    Apr. 26, 2018

(30) Foreign Application Priority Data

Oct. 20, 2016  (JP) ................. 2016/205927

(51) Int. Cl.
*B41J 11/00*    (2006.01)
*B41J 2/21*     (2006.01)
*C09D 11/101*   (2014.01)
*C09D 11/32*    (2014.01)
*B41M 7/00*     (2006.01)
(Continued)

(52) U.S. Cl.
CPC ............ *B41J 2/2107* (2013.01); *B41J 2/145* (2013.01); *B41J 2/2103* (2013.01); *B41J 2/2114* (2013.01); *B41J 11/002* (2013.01); *B41M 7/009* (2013.01); *B41M 7/0081* (2013.01); *C09D 11/101* (2013.01); *C09D 11/107* (2013.01); *C09D 11/32* (2013.01)

(58) Field of Classification Search
CPC ..... B41J 2/2114; B41J 11/002; C09D 11/101; C09D 11/32
See application file for complete search history.

(56) References Cited

U.S. PATENT DOCUMENTS

2008/0192100 A1 * 8/2008 Nakajima ............ B41J 2/2107 347/102
2017/0001450 A1 * 1/2017 Koers ................. B41J 3/4073

FOREIGN PATENT DOCUMENTS

EP    2439243     4/2012
JP    2003200565  7/2003

OTHER PUBLICATIONS

"Search Report of European Counterpart Application," dated Mar. 21, 2018, p. 1-p. 9.

* cited by examiner

*Primary Examiner* — Kristal Feggins
*Assistant Examiner* — Kendrick X Liu
(74) *Attorney, Agent, or Firm* — JCIPRNET

(57) ABSTRACT

A printer that performs printing on a medium by an inkjet scheme includes an inkjet head, for ejecting droplets of an ink containing a solvent to be evaporated to fix the ink on the medium; and an ultraviolet light source that irradiates the ink with an ultraviolet light. The ink contains a colorant, the solvent, an exothermic polymerizable substance, and a polymerization initiator. The colorant develops a color of the ink. The exothermic polymerizable substance causes a polymerization reaction to generate heat. The polymerization initiator starts the polymerization reaction of the exothermic polymerizable substance in response to irradiation with ultraviolet light. The ultraviolet light source irradiates the ink adhered to the medium with ultraviolet light to make the exothermic polymerizable substance cause the polymerization reaction. Thus, the solvent in the ink is evaporated by the heat generated by the polymerization reaction to fix the ink on the medium.

20 Claims, 5 Drawing Sheets

(51) Int. Cl.
*B41J 2/145* (2006.01)
*C09D 11/107* (2014.01)

| Ink | Print heater | UV irradiation energy | | | |
|---|---|---|---|---|---|
| | | 100-200 mJ/cm$^2$ | 200~600 mJ/cm$^2$ | 600~2000 mJ/cm$^2$ | 2000~4000 mJ/cm$^2$ |
| Ultraviolet curable ink | Unnecessary | UV cure: completed | Medium: deformed by excessive heat Ink: partially scorched | Medium: creased Ink: noticeably scorched | Medium: damaged Ink: noticeably scorched |
| SUV ink | Necessary For solvent evaporation | Unchanged Solvent: not evaporated | Solvent: incompletely evaporated Fixation: insufficient | Solvent: almost all evaporated Fixation: with no ink bleeding | Completely dried and fixed |
| A ink | Unnecessary | Solvent: incompletely evaporated Fixation: insufficient | Solvent: almost all evaporated Fixation: with no ink bleeding | Solvent: completely evaporated Fixation: with no ink bleeding | Solvent: completely evaporated Fixation: with no ink bleeding |
| B ink | Unnecessary | Solvent: incompletely evaporated Fixation: insufficient | Solvent: almost all evaporated Fixation: with no ink bleeding | Solvent: evaporated Fixation: with no ink bleeding | Solvent: evaporated Fixation: with no ink bleeding |

FIG. 3

PRINTER AND PRINTING METHOD

CROSS-REFERENCE TO RELATED APPLICATIONS

The present application claims priority under 35 U.S.C. § 119 to Japanese Patent Application No. 2016-205927, filed Oct. 20, 2016. The contents of this application are incorporated herein by reference in their entirety.

TECHNICAL FIELD

The present disclosure relates to a printer and a printing method.

BACKGROUND ART

Conventionally, inkjet printers to perform printing by inkjet scheme have been widely employed (for example, see Japanese Unexamined Patent Publication No. 2003-200565). As inks for use in the inkjet printers, drying-by-evaporation inks have been generally used, for example, water-based inks (aqueous-formulation inks) such as water-based pigment inks, latex inks, and pigment-in-resin dispersion inks, and solvent inks containing organic solvents as solvents. In such cases, a drying-by-evaporation ink refers to an ink to be fixed on a medium by evaporating a solvent in the ink.

In an inkjet printer using a drying-by-evaporation ink such as a water-based ink, the ink is dried by heating by a heater, for example, to prevent bleeding of the ink and perform drying and fixation of the ink. As a more specific method in this case, for example, a method has been known to heat a medium by a heater (print heater) to prevent ink bleeding, and subsequently dry and fix the ink by a postheater (afterheater) such as various kinds of heaters and infrared lamps. As a method for preventing ink bleeding, for example, a method has been conventionally known to form an image-receiving layer of the ink on a printing target medium (medium to be printed).

The contents of the Japanese Unexamined Patent Publication No. 2003-200565 are incorporated herein by reference in their entirety.

In adopting the method for forming the image-receiving layer on the medium, only the specific medium on which the image-receiving layer is formed in advance is to be printed. In this case, a solvent in the ink may remain in the image-receiving layer and cause a disadvantageous circumstance. For example, in a case of a configuration in which a medium is wound up after printing, ink setoff is more likely to occur unfortunately at the time of winding up the medium. When a medium such as paper is used as a base layer under the image-receiving layer, printing using a significant amount of the ink such as printing a color image (color printing) may disadvantageously make curls and cockling of the medium, for example, more likely to occur. In use of a fabric medium such as a dishcloth, there is a need to prepare a medium such as a fabric coated with a pretreatment agent (such as a sizing material), which functions to prevent ink bleeding and assist color development, as the image-receiving layer. In this case, it is necessary to hire a vendor specializing in the pretreatment, which may unfortunately result in time loss and cost increase.

In heating the medium by the print heater to prevent ink bleeding, it is necessary to increase the heating temperature at a position of the platen opposed to inkjet heads so as to speed up printing, for example. In this case, however, increasing the heating temperature causes nozzle surfaces of the inkjet heads to be likewise heated, which unfortunately makes nozzle clogging more likely to occur.

In this case, it is also considered that a solvent having a low boiling point, for example, is used as the solvent in the ink to facilitate evaporation of the ink so as to eliminate or minimize ink bleeding. In this case, however, evaporation of the ink at nozzles is also quickened to disadvantageously increase frequency of nozzle clogging. Consequently, there have conventionally been cases in which use of the drying-by-evaporation ink involves difficulty in reducing ink bleeding.

Disadvantageous phenomena such as ink bleeding caused in use of the drying-by-evaporation ink are particularly noticeable in such cases as increasing the printing speed, and performing deep color printing and both-side printing. The reason is that an increase in the amount of the ink that lands in a unit area per unit time (ejection amount of the ink) makes the ink fail to dry quickly enough. Moreover, in this case, when a medium of paper or fabric, for example, is used, phenomena such as curls and cockling in particular are more likely to occur.

As a method for heating the medium, as described above, the method of additionally heating the medium by the postheater such as an infrared lamp to dry the medium at high speed has been also known. Normally, however, the infrared lamp is not to be switched on and off at high speed. In this case, therefore, it is necessary to constantly keep the postheater such as the infrared lamp in a heating state. As a result, the inkjet heads and other components are also heated constantly to make nozzle clogging or such phenomena more likely to occur. Furthermore, in this case, a condition set to dry the ink at high temperature causes another disadvantageous circumstance that a medium with low heat-resistance is not to be used. In some cases, the medium and the ink may be scorched or discolored.

In use of the infrared lamp, conversion efficiency into infrared light, which is effective for heating, is decreased to cause light including a significant amount of visible light, for example, which is less effective for heating, is to be emitted. In this case, it becomes difficult to effectively heat the ink alone, and it is more likely to heat the medium and components in its vicinity, for example, at the same time. As a result, much of the energy supplied to the infrared lamp ends up as superfluous heat to be released through the medium, for example, and wasted. Eventually, the utilization factor of the energy for drying is decreased.

In use of inks of a plurality of colors, when the inks are heated by the infrared lamp, a difference may be unfortunately caused in how the inks are heated depending on the ink color. More specifically, for example, suppose that inks of colors, yellow (Y), magenta (M), cyan (C), and black (K), are used, and that inks containing pigments as colorants are used. In such a case, only a carbon black pigment of black (K) absorbs more infrared light than inks of the other colors. In view of this, when a setting is made as to intensity of the infrared light to appropriately dry the inks of other colors such as Y, M, and C, the black ink is to be scorched. Conversely, when a setting is made as to intensity of the infrared light in accordance with the black ink, a difference is to be caused in drying levels depending on the ink color.

As inks for use in inkjet printers, conventionally, ultraviolet curable inks (UV inks) that cure when irradiated with ultraviolet light have been also generally used other than the drying-by-evaporation inks. In using an ultraviolet curable ink, the ink is irradiated with ultraviolet light immediately after droplets of the ink have landed on the medium, for example, so as to stop bleeding of the ink on the medium in an instant. In this case, since there is no need to heat the medium, it is unlikely to cause disadvantageous phenomena such as nozzle clogging. In using the ultraviolet curable ink, however, when ink bleeding is stopped by irradiating the ink with ultraviolet light immediately after landing of the ink, the ink is cured before dots of the ink are sufficiently flattened. As a result, the surface of the ink becomes uneven and more likely to be a matte surface. Moreover, the thickness of the ink may become excessively large in some cases. Consequently, a state in which a thin and flat image is printed is not to be obtained appropriately. Depending on uses of printing, there are also cases in which a desired printing quality is unobtainable. In view of this, uses of printing or such factors make it necessary to use the drying-by-evaporation ink instead of the ultraviolet curable ink.

As a configuration that eliminates disadvantages of the ultraviolet curable ink, such as making the surface matte and increasing the thickness of the ink, so as to ensure printing with high glossiness and less unevenness, a configuration of using a solvent UV ink (SUV ink), which is a solution of an ultraviolet curable ink diluted with a solvent, has been also conventionally known. In this case, however, since it becomes necessary to devolatilize the solvent immediately after droplets of the ink have landed, approximately the same disadvantageous phenomena as in the case of using the drying-by-evaporation ink are to be caused.

Conventionally, therefore, there has been a demand for methods to prevent ink bleeding more appropriately in using the drying-by-evaporation ink. In view of this, it is an object of the present disclosure to provide a printer and a printing method that solve the above-described unfortunate circumstances.

The inventor of the present application conducted intensive study on drying-by-evaporation inks in which to perform printing while appropriately eliminating or minimizing ink bleeding. In the intensive study, the inventor first considered directly heating the inks by irradiating the inks with ultraviolet light. In this case, an ink containing an ultraviolet light absorbent is used, for example, and heat generated by the ultraviolet light absorbent irradiated with ultraviolet light is utilized to devolatilize a solvent in the ink. This configuration ensures that, as compared with a case of heating a medium by a device such as a heater, the ink on the medium is heated more directly and more effectively. This configuration also ensures that the ink is quickly dried after the ink has landed on the medium, so as to implement a state in which color bleeding is unlikely to occur.

In order to prevent ink bleeding more appropriately, however, there are cases in which it is preferable to devolatilize the solvent in the ink in a shorter time. For this purpose, it is desirable to add to the ink a substance that generates heat more efficiently when irradiated with ultraviolet light.

In this regard, the inventor of the present application performed various experiments, for example, to find that use of an ink containing an exothermic polymerizable substance and a polymerization initiator ensures drying of the ink in a shorter time. The exothermic polymerizable substance is a substance that generates heat by its polymerization reaction. The polymerization initiator starts the polymerization reaction of the exothermic polymerizable substance in response to ultraviolet irradiation. The inventor also found that this configuration ensures more appropriate prevention of ink bleeding. The inventor of the present application conducted further study and research to find features required for obtaining such effects, which led to the present disclosure.

SUMMARY

According to one aspect of the present disclosure, a printer that performs printing on a medium by an inkjet scheme includes: an inkjet head and an ultraviolet light source. The inkjet head is configured to eject ink droplets of an ink by the inkjet scheme. The ink contains a solvent to be evaporated to fix the ink on the medium. The ultraviolet light source is configured to irradiate the ink with ultraviolet light. The ink contains a colorant, the solvent, an exothermic polymerizable substance, and a polymerization initiator. The colorant is configured to develop a color of the ink. The exothermic polymerizable substance is configured to cause a polymerization reaction to generate heat. The polymerization initiator is configured to start the polymerization reaction of the exothermic polymerizable substance in response to irradiation with the ultraviolet light. The ultraviolet light source is configured to irradiate the ink adhered to the medium with the ultraviolet light to make the exothermic polymerizable substance cause the polymerization reaction in such a manner that the solvent in the ink is evaporated by the heat generated by the polymerization reaction so as to fix the ink on the medium.

This configuration, in which the ink on the medium is irradiated with ultraviolet light, ensures direct and effective heating of the ink. This configuration also ensures that the ink is appropriately dried immediately after the ink droplets have landed and before ink bleeding occurs, for example. Consequently, this configuration appropriately prevents ink bleeding, for example. In this case, as compared with a case of drying the ink only by heating the medium, for example, it is also possible to eliminate or minimize phenomena such as an influence on a nozzle surface of the inkjet head. This configuration, therefore, ensures that the solvent in the ink is more appropriately evaporated.

This ink may be considered to be a drying-by-evaporation ink, for example. In this case, the printer dries the ink mainly by causing the ultraviolet light sources to irradiate the ink with ultraviolet light. The printer may further include, for example, a device such as a heater to heat the medium. In this case, the heater heats the medium, for example, to adjust a temperature of the medium in a predetermined range. With this arrangement, the heater adjusts, for example, an initial condition for heating by ultraviolet irradiation to be a preset constant condition. As the heater, it is also considered, for example, to employ a heater to heat the medium after ultraviolet irradiation. In this case, the heater heats the medium, for example, to evaporate the solvent remaining in the ink after ultraviolet irradiation by the ultraviolet light source.

Alternatively, as an embodiment of the present disclosure, it is likewise considered to adopt a printing method, for example, having features similar to the above-described features. In this case as well, effects similar to the above-described effects, for example, are obtainable.

The embodiments of the present disclosure ensure that ink bleeding, for example, is appropriately eliminated or minimized. Thus, for example, high-quality printing is performed more appropriately.

BRIEF DESCRIPTION OF THE DRAWINGS

A more complete appreciation of the present disclosure and many of the attendant advantages thereof will be readily obtained as the same becomes better understood by reference to the following detailed description when considered in connection with the accompanying drawings, wherein:

FIG. 2A to FIG. 2C are simplified (modeled) diagrams illustrating an exemplary printing operation by the printer 10 in this embodiment, of which FIG. 2A illustrates an exemplary operation of ejecting ink droplets onto a medium 50, FIG. 2B is a cross-sectional view of one example of the medium 50 after completion of the printing operation, and FIG. 2C is a cross-sectional view of another example of the medium 50 after completion of the printing operation.

FIG. 3 is a table showing relationships between UV irradiation energies and states of inks.

FIG. 4A and FIG. 4B are diagrams illustrating modifications of the configuration of the printer 10, of which FIG. 4A illustrates one of the modifications of the configuration of the printer 10, and FIG. 4B illustrates an exemplary configuration of a head unit 12 in another modification of the printer 10.

DESCRIPTION OF THE EMBODIMENTS

Figure 1A:
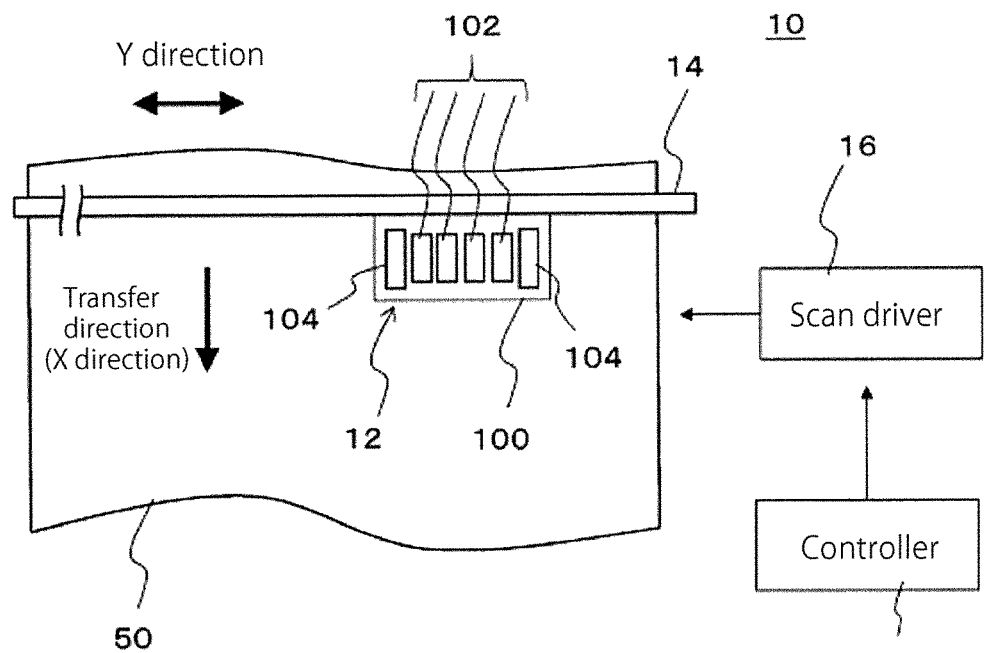
FIG. 1A and FIG. 1B illustrate an exemplary configuration of a printer 10 according to an embodiment, and are respectively a plan view and a cross-sectional view of an exemplary configuration of an essential part of the printer 10.
Figure 1B:
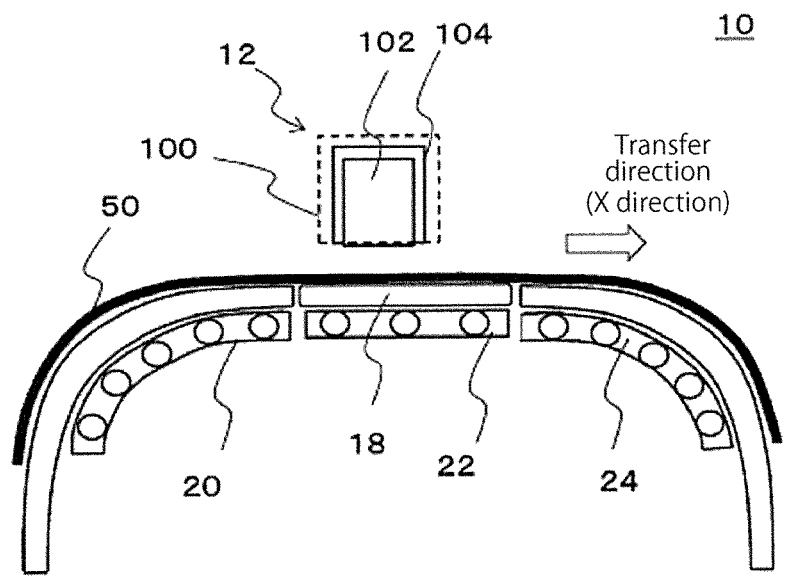

An embodiment of the present disclosure will now be described with reference to the accompanying drawings, wherein like reference numerals designate corresponding or identical elements throughout the various drawings. FIG. 1A and FIG. 1B illustrate an exemplary configuration of a printer 10 according to the embodiment. FIG. 1A and FIG. 1B are respectively a plan view and a cross-sectional view of an essential part of the printer 10, illustrating its exemplary configuration. In this embodiment, the printer 10 is an inkjet printer to print a medium 50 to be printed by an inkjet scheme. The printer 10 includes a head unit 12, a guide rail 14, a scan driver 16, a platen 18, a preheater 20, a print heater 22, an afterheater 24, and a controller 26.

It should be noted that except for its features to be described below, the printer 10 may have identical or similar features that known inkjet printers have. In addition to the configuration described below, the printer 10 may further include known structures required for the printing operation, for example. In this embodiment, the printer 10 prints, for example, the medium 50 that has undergone no pretreatment for preventing ink bleeding.

The head unit 12 is a unit (IJ head unit) to eject ink droplets onto the medium 50, and includes a carriage 100, a plurality of inkjet heads 102, and a plurality of ultraviolet light sources 104. The carriage 100 is a holder to hold other structures in the head unit 12.

The plurality of inkjet heads 102 are ejection heads to eject ink droplets by the inkjet scheme. In this embodiment, the plurality of inkjet heads 102 eject ink droplets of different colors from each other to adhere inks of the colors onto the medium 50. More specifically, the plurality of inkjet heads 102 eject ink droplets of respective process colors for color printing. The process colors are yellow (Y), magenta (M), cyan (C), and black (K), for example. The plurality of inkjet heads 102, which are arrayed in a predetermined main scanning direction (Y direction in the drawings), eject ink droplets while moving in the main scanning direction. Thus, the plurality of inkjet heads 102 perform a main scanning operation to adhere the inks to the medium 50. In this embodiment, the plurality of inkjet heads 102 perform the main scanning operation bidirectionally (in both directions) toward one side and toward the other side of the main scanning direction to print a color image on the medium 50.

In this embodiment, the inkjet heads 102 each eject ink droplets of an ink at least containing a solvent, an exothermic polymerizable substance (exothermic UV polymerization composite), a polymerization initiator (UV photopolymerization initiator), and a colorant. In this case, the solvent refers to a liquid for dispersing or dissolving other ingredients in the ink. As the solvent, a water-based solvent that contains water as the main ingredient (principal ingredient), for example, may be suitably used. In this case, the main ingredient of the solvent refers to, for example, an ingredient having the greatest content in the solvent. It is also considered to use, as the solvent, a substance such as an organic solvent.

The exothermic polymerizable substance is a substance that generates heat by its polymerization reaction. As the exothermic polymerizable substance, for example, a monomer or oligomer that polymerizes in response to a reaction of the polymerization initiator with respect to ultraviolet light may be suitably used. The exothermic polymerizable substance may be also regarded as, for example, a composite that generates ultraviolet curable resin (UV curable resin) along with an exothermic polymerization reaction (exothermic UV polymerization composite).

The polymerization initiator is a substance that starts the polymerization reaction of the exothermic polymerizable substance when irradiated with ultraviolet light (UV photopolymerization initiator). The polymerization initiator may be also regarded as a substance that functions as an ultraviolet light absorbent to absorb ultraviolet light. The colorant refers to a substance to develop a color of the ink. As the colorant, for example, a pigment or a dye may be suitably used.

In the inks in this embodiment, an identical or similar monomer or oligomer used in known ultraviolet curable inks, for example, may be used as the exothermic polymerizable substance. As the polymerization initiator, for example, an identical or similar polymerization initiator used in known ultraviolet curable inks may be used.

However, the inks used for the inkjet heads 102 in this embodiment are drying-by-evaporation inks. In this case, the exothermic polymerizable substance is used not to cure the inks but to devolatilize the solvents in the inks by generating heat. In this case, when irradiated with ultraviolet light, the inks themselves generate heat to evaporate the solvents. Features of the inks used in this embodiment will be described in more detail later.

The plurality of ultraviolet light sources 104 are light sources to emit ultraviolet light, and irradiate the inks adhered to the medium 50 with ultraviolet light to make the exothermic polymerizable substances in the inks cause polymerization reactions. Thus, the ultraviolet light sources 104 heat the inks by the heat generated by the polymerization reactions, so as to evaporate the solvents in the inks and fix the inks on the medium 50.

It should be noted that evaporating the solvents in the inks refers to, for example, volatilizing and removing (devolatilizing) the solvents from the inks. Evaporating the solvents in the inks by the heat generated by the polymerization reactions and fixing the inks on the medium 50 refers to, for example, substantially fixing the inks on the medium 50. In this case, substantially fixing the inks on the medium 50 refers to, for example, increasing viscosity of the inks at least to such a degree that no ink bleeding occurs on the medium 50 to make the inks unmoved on the medium 50. Ink bleeding refers to, for example, ink bleeding between colors that occurs when inks of different colors are mixed. The viscosity of the inks to such a degree that no ink bleeding occurs refers to, for example, such viscosity that substantially no ink bleeding occurs within an allowable range in accordance with demanded printing quality and accuracy. In view of this, the ultraviolet light sources 104 irradiate the inks with ultraviolet light before mixture of different color inks on the medium 50 causes ink bleeding. Thus, the viscosity of the inks is increased at least to such viscosity that substantially no ink bleeding occurs.

It may be also considered that such viscosity that substantially no ink bleeding occurs refers to, for example, such viscosity that no ink bleeding occurs until the inks are completely dried and fixed on the medium 50. More specifically, the ultraviolet light sources 104 irradiate the inks with ultraviolet light to make the viscosity of the inks on the medium 50 equal to or higher than 50 mPa·s, for example, or preferably, equal to or higher than 100 mPa·s, or more preferably, equal to or higher than 200 mPa·s. Evaporating the solvents in the inks may refer to at least partly evaporating the solvents in the inks within a range that makes the viscosity of the inks have such a value that no ink bleeding occurs.

In this embodiment, the ultraviolet light sources 104 heat the inks with heaters such as the print heater 22 to evaporate the solvents in the inks. The plurality of ultraviolet light sources 104 are respectively disposed on one side and on the other side of the array of the plurality of inkjet heads 102 in the main scanning direction. At the time of a main scanning operation, the ultraviolet light sources 104 move along with and at the same speed as the inkjet heads 102. Consequently, at the time of the main scanning operation, one of the plurality of ultraviolet light sources 104 is located at the rear side of the inkjet heads 102 in the movement direction (traveling direction) whereas the other of the plurality of ultraviolet light sources 104 is located at the front side of the inkjet heads 102 in the movement direction. In the bidirectional main scanning operation, in accordance with a direction of movement of the inkjet heads 102, the ultraviolet light source 104 on the rear side of the inkjet heads 102 irradiates the inks on the medium 50 with ultraviolet light immediately after the inks have landed. Thus, the ultraviolet light source 104 emits ultraviolet light to a region that the inkjet heads 102 have just passed by, and irradiates the inks on the medium 50 with ultraviolet light immediately after the inks have landed on the medium 50. Then, before ink bleeding occurs on the medium 50, the viscosity of the inks is increased to prevent ink bleeding.

As the ultraviolet light source 104, preferably, a light source capable of on/off control of ultraviolet irradiation is used. As such a light source, a light source with semiconductor to generate ultraviolet light (semiconductor light source) such as a UVLED and an ultraviolet LD (laser diode) may be suitably used. With this configuration, ultraviolet light may be emitted, for example, at a desired timing and with high accuracy. More specifically, in this embodiment, the ultraviolet light source 104 is a light source with UVLEDs (UVLED irradiator). In this case, more preferably, a light-condensing ultraviolet LED irradiator to function as a light condenser is used as the ultraviolet light source 104.

In this case, preferably, a light-emission wavelength of UVLEDs for use in the ultraviolet light source 104 is made approximately equal to a wavelength range absorbed by the polymerization initiator to function as an ultraviolet light absorbent in the ink. With this configuration, for example, irradiation with ultraviolet light makes the ink generate heat more efficiently. This configuration may be regarded as, for example, a configuration realized by combining the polymerization initiator having high absorptivity only in a predetermined wavelength range in the ultraviolet light range (UV light range) with the UVLEDs.

As the UVLED, a UVLED to generate ultraviolet light having a wavelength range of, for example, 200 nm to 400 nm may be suitably used. In this case, preferably, a UVLED having an emission center wavelength in a range of, for example, 360 nm to 390 nm is used. This configuration ensures that, for example, the inks on the medium 50 are appropriately heated to high temperature to suitably evaporate the solvents in the inks. In this case, as the polymerization initiator in the ink, it is preferable to use a substance that effectively absorbs ultraviolet light in the wavelength range generated by the UVLED and that has no notable absorptivity in the visible range. This configuration enables only the inks to efficiently absorb ultraviolet light emitted from the ultraviolet light sources 104, for example, so as to solely heat a layer of the inks on the medium 50 selectively and effectively.

In this embodiment, the ultraviolet light sources 104 are disposed at positions displaced from the plurality of inkjet heads 102 so as to emit ultraviolet light to the inks on the medium 50 outside of a region opposed to the inkjet heads 102. More specifically, in the configuration illustrated in the drawings, the ultraviolet light sources 104 are disposed at the positions displaced from the inkjet heads 102 in the main scanning direction so as to emit ultraviolet light to the inks on the medium 50 outside of the region opposed to the inkjet heads 102. This configuration ensures that the inkjet heads 102 are appropriately prevented from directly receiving an influence of heating the inks with ultraviolet light and an influence of the evaporated solvents. Moreover, in this case, changing a distance between the inkjet head 102 and the ultraviolet light source 104, for example, makes it possible to appropriately adjust time between landing of the inks on the medium 50 and irradiation with ultraviolet light. Furthermore, adjusting a width of the ultraviolet light source 104 in the main scanning direction makes it also possible to appropriately adjust time of ultraviolet irradiation (continuous irradiation time) by the ultraviolet light source 104.

It should be noted that, preferably, a width of the ultraviolet light source 104 in a sub-scanning direction (X direction in the drawings) perpendicular to the main scanning direction is equal to or larger than a print width by the inkjet heads 102. In this case, the print width by the inkjet heads 102 refers to, for example, a width of a region in the sub-scanning direction onto which ink droplets are ejected by the inkjet heads 102 in a single main scanning operation. In this embodiment, the sub-scanning direction is a direction parallel to a transfer direction (sheet feed direction) in which the medium 50 is transferred.

In this embodiment, as illustrated in FIG. 1A, the ultraviolet light source 104 has a width in the sub-scanning direction that is larger than the print width so as to emit ultraviolet light to portions displaced from the region opposed to the inkjet heads 102 in the sub-scanning direction. With this arrangement, the ultraviolet light sources 104 emit ultraviolet light to not only a portion overlapping the inkjet heads 102 but also a portion on the downstream side of the inkjet heads 102 in the transfer direction of the medium 50. This configuration ensures, for example, appropriate adjustment of a timing to end heating by the ultraviolet light sources 104. Also, in this case, emitting ultraviolet light to the portion on the downstream side of the inkjet heads 102 ensures, for example, reduction in time for completely evaporating and drying the inks after heating.

Preferably, directivity of ultraviolet light emitted by the ultraviolet light sources 104 is set in such a manner that no ultraviolet light reaches the nozzle surfaces of the inkjet heads 102. This configuration ensures that the inkjet heads 102 are appropriately prevented from receiving the influence of heating by the ultraviolet light sources 104. A more detailed description will be given later on how ultraviolet light is emitted by the ultraviolet light sources 104 as well as a detailed description on the inks used in this embodiment.

The guide rail 14 is a rail member extending in the main scanning direction to guide movement of the carriage 100 at the time of the main scanning operation. The scan driver 16 is a driver to cause the inkjet heads 102 to perform the main scanning operation and the sub-scanning operation. More specifically, in this embodiment, the scan driver 16 moves the carriage 100 along the guide rail 14 so as to move the inkjet heads 102 and other components held by the carriage 100 in the main scanning direction. Based on printing data indicating an image to be printed, the scan driver 16 causes the moving inkjet heads 102 to eject ink droplets to perform the main scanning operation.

Moreover, the scan driver 16 causes the inkjet heads 102 to move in the sub-scanning direction relative to the medium 50 to perform the sub-scanning operation. In this embodiment, the scan driver 16 transfers the medium 50 in the transfer direction parallel to the sub-scanning direction to cause the inkjet heads 102 to perform the sub-scanning operation. The scan driver 16 transfers the medium 50 in the intervals between main scanning operations so as to change a region of the medium 50 to be opposed to the inkjet heads 102 in a subsequent main scanning operation. Thus, the scan driver 16 causes the inkjet heads 102 to eject ink droplets onto each position on the medium 50. Furthermore, in this embodiment, at the time of the main scanning operation, the scan driver 16 causes the ultraviolet light sources 104 to move along with the inkjet heads 102 so as to emit ultraviolet light in accordance with positions of the ink droplets ejected by the inkjet heads 102.

The platen 18 is a platform member at a position opposed to the head unit 12, and has an upper surface on which the medium 50 is placed so as to support and keep the medium 50 opposed to the head unit 12. In this embodiment, the platen 18 houses heaters to heat the medium 50, namely, the preheater 20, the print heater 22, and the afterheater 24.

The preheater 20, the print heater 22, and the afterheater 24 are the heaters to heat the medium 50. At least some of these heaters heat the medium 50, for example, to adjust a temperature of the medium 50 within a predetermined range. With this arrangement, an initial condition for heating by irradiation with ultraviolet light (initial condition for ultraviolet irradiation) is adjusted to be the preset constant condition. At least some of these heaters heat the inks on the medium 50 through the medium 50 to devolatilize the solvents in the inks to dry the inks. In addition to the ultraviolet light sources 104, these heaters are employed to devolatilize the solvents in the inks more appropriately to speed up drying of the inks even further. This ensures that the inks are fixed on the medium 50 more appropriately.

More specifically, the preheater 20 is a heater to preliminarily heat the medium 50. The preheater 20 is disposed on the upstream side of the inkjet heads 102 in the transfer direction of the medium 50 so as to heat a region of the medium 50 before ink droplets land on the region. With this arrangement, an initial condition for ultraviolet irradiation is adjusted to be the preset constant condition.

The print heater 22, which is opposed to the inkjet heads 102, is a heater to heat the medium 50 from its back side. Heating the medium 50 at this position, the print heater 22, for example, maintains the temperature of the medium 50 preliminarily heated by the preheater 20. With this arrangement, an initial condition for ultraviolet irradiation is maintained to be the constant condition. This configuration ensures that without regard to a condition such as ambient temperature, for example, the medium 50 is maintained at a predetermined temperature. Thus, irregularity in conditions for evaporating the solvents in the inks (drying conditions) is appropriately reduced.

In this case, the print heater 22 may be regarded as, for example, an auxiliary heater. In this configuration, the ultraviolet light sources 104 irradiate with ultraviolet light the inks on the medium 50 heated by the print heater 22 in such a manner that both of the ultraviolet light sources 104 and the print heater 22 evaporate the solvents in the inks. This configuration ensures that from the inks that have just landed on the medium 50, for example, the solvents are devolatilized more appropriately. Thus, the viscosity of the inks is more appropriately increased before ink bleeding occurs on the medium 50.

The afterheater 24 is a heater disposed on the downstream side of the inkjet heads 102 in the transfer direction. The afterheater 24 further heats the medium 50 after it has passed the region opposed to the inkjet heads 102 and the ultraviolet light sources 104, so as to evaporate the solvents remaining in the inks after irradiation with ultraviolet light by the ultraviolet light sources 104. With this arrangement, the afterheater 24, for example, dries the inks on the medium 50 more reliably to fix the inks on the medium 50. The afterheater 24 may be regarded as, for example, a postheater to additionally heat the inks on the medium 50. Use of the afterheater 24 ensures that the inks are fixed on the medium 50 more reliably to increase an amount of the fixation.

It should be noted that, in FIG. 1B, a heat-transfer heater to heat the medium 50 by heat conduction from the inside of the platen 18 is illustrated as the afterheater 24. In a case of using the medium 50 of low heat conductivity, however, a heater having a configuration other than the heat-transfer type may be employed as the afterheater 24. In this case, a dryer such as a fan heater and an infrared heater may be employed as the afterheater 24. Alternatively, such a structure may be added to the heat-transfer afterheater 24.

The controller 26 is, for example, a CPU of the printer 10 to control each component of the printer 10. This embodiment ensures appropriate printing of the medium 50, for example.

As described above, in this embodiment, the inks containing the exothermic polymerizable substances and the polymerization initiators are irradiated with ultraviolet light to cause the exothermic polymerizable substances to generate heat to evaporate the solvents in the inks, for example, immediately after the inks droplets have landed. In this case, even though the print heater 22, for example, is employed to heat the medium 50 at the position opposed to the inkjet heads 102 as in this embodiment, it is ensured that the heating temperature by the print heater 22 is appropriately suppressed. Depending on an environment for printing, a demanded printing quality, and other factors, the solvents in the inks may be evaporated without heating by the print heater 22.

Consequently, this embodiment ensures that while the influence on the nozzle surfaces of the inkjet heads 102 is eliminated or minimized, for example, the solvents in the inks are appropriately devolatilized. Thus, it is ensured that before ink bleeding occurs, for example, the viscosity of the inks is adequately increased to fix the inks on the medium 50 appropriately. This embodiment further ensures that use of the preheater 20, the print heater 22, and the afterheater 24 to heat the medium 50 causes the inks to be dried more appropriately as compared with, for example, a case in which heating is performed only by the ultraviolet light sources 104. Thus, this embodiment ensures that in the case of using the drying-by-evaporation inks, for example, occurrence of ink bleeding is suppressed more appropriately. This leads to appropriate performance of high-quality printing, for example.

As described above, in this embodiment, as a device to heat the inks, the heaters such as the print heater 22 are employed as well as the ultraviolet light sources 104. In this case, it may be considered that, for example, the ultraviolet light sources 104 are used as a main heating device, and that the heaters such as the print heater 22 are used as an auxiliary heating device. In this case, preferably, the ultraviolet light sources 104 as the main heating device and the inks used have a relationship that enables drying of the inks even if the heaters such as the print heater 22 as the auxiliary heating device are not employed. In this case, as described above, the heaters such as the preheater 20 and the print heater 22 may be also regarded as a structure for heating the medium 50 to adjust and maintain the initial condition.

In accordance with a demanded printing quality and other factors, in a modification of the configuration of the printer 10, for example, the inks may be heated only by the ultraviolet light sources 104 without using the heaters such as the print heater 22. In another modification of the configuration of the printer 10, for example, a different heating device may be added to the ultraviolet light sources 104 and the heaters such as the print heater 22. In a non-limiting example, as described above, it may be also considered to additionally dispose a heating device such as an infrared light source at a position opposed to the afterheater 24 on the downstream side of the ultraviolet light sources 104 in the transfer direction of the medium 50, for example. This configuration ensures that heating by the heating device such as the infrared light source in addition to the afterheater 24 causes the inks on the medium 50 to be dried more reliably and more appropriately. In the case of using the heating device such as the infrared light source, omission of the afterheater 24 may be also considered.

In the case of using the inks in this embodiment, after irradiation with ultraviolet light, the exothermic polymerizable substances polymerize to generate resin in the inks. In this case, it is considered that printing is completed, for example, with the resin remaining on the medium 50. The inks in this embodiment that are used in this manner will be hereinafter referred to as inks A. As an operation in printing in the inks in this embodiment, for example, removal of such resin after irradiation with ultraviolet light and before completion of printing is also considered. The inks in this embodiment that are used in this manner will be hereinafter referred to as inks B. Features of the inks A and the inks B will be described in more detail later.

Next, an operation of printing the medium 50 (printing operation) in this embodiment will be described in more detail. First, for ease of description, an exemplary printing operation by a conventional printer will be described. In printing by the conventional printer having a configuration in which drying-by-evaporation inks are used, a whole medium is heated by heaters such as a print heater. Thus, solvents in the inks are evaporated. More specifically, in this case, the print heater, which is disposed inside of a platen and at a position opposed to inkjet heads, heats a whole region of the medium on which ink droplets land, to a temperature approximately equal to or lower than 70° C. (for example, 50° C. to 70° C.). Thus, a layer of the inks formed on the surface of the medium is heated to increase viscosity of the inks so as to eliminate or minimize ink bleeding.

In the case of heating the medium by the print heater in this manner, the inkjet heads opposed to the print heater through the medium in-between are to be also affected by heat radiation. Consequently, when heating temperature by the print heater is made higher than the above-mentioned temperature, the influence of heat radiation on the inkjet heads is increased. As a result, for example, inks around nozzles of the inkjet heads are dried to make nozzle clogging or such phenomena more likely to occur. This makes it difficult to make the heating temperature higher than the above-mentioned range. When the heating temperature is increased to speed up evaporation of the solvents, there are cases, for example, in which the evaporated solvents cohere and stick to the inkjet heads at a relatively low temperature and hinder steady ink ejection. Therefore, in this respect as well, it involves difficulty to increase the heating temperature by the print heater.

Conversely, when the heating temperature is made lower than the above-mentioned temperature, it takes longer to dry the inks. This results in, for example, an increase in disadvantageous occurrence of ink bleeding. Also, this may unfortunately result in an excessive increase in the amount of the inks permeated in the medium until the inks are dried. Consequently, it is likewise difficult to make the heating temperature lower than the above-mentioned range. When the inks are dried by the heaters such as the print heater, therefore, it is necessary to set the heating temperature of the medium within the limited temperature range.

However, in this case as well, when printing is speeded up, for example, an ink drying speed becomes lower than the printing speed, which may cause disadvantageous phenomena such as ink bleeding. More specifically, in order to speed up printing, for example, the number of passes (multi-pass number) of printing is to be decreased. In this case, it is considered that since the amount of the inks that land in a unit area per unit time is increased, the inks may fail to be dried quickly enough. As a result, in the case of printing by the printer of this configuration, increasing the printing speed is to be unfortunately limited.

In this case, when a permeable medium is used as the medium, the inks permeate into the medium deeply as time elapses after the inks have landed, and an amount of the inks remaining on the surface of the medium is decreased. This results in a decrease in printing density and makes printed color thinner. Also, this becomes more likely to cause disadvantageous blurring or such phenomena of a printing result (printed matter). In the case of printing by the printer of this configuration, therefore, when the printing speed is increased, the color of the printing result may unfortunately become thin, and disadvantageous ink bleeding may be more likely to occur.

Figure 2A:
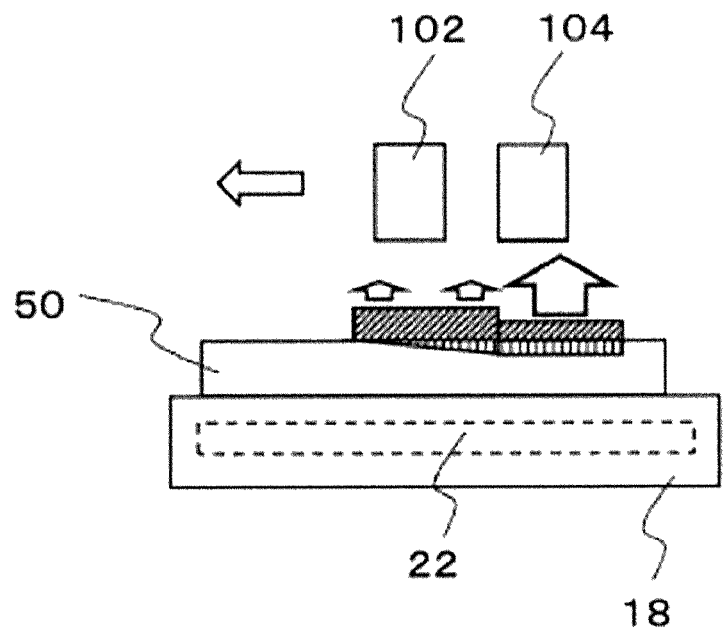
Figure 2B:
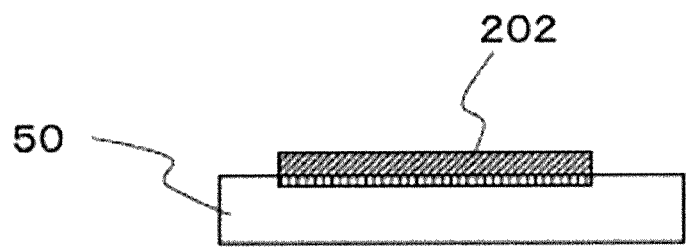
Figure 2C:
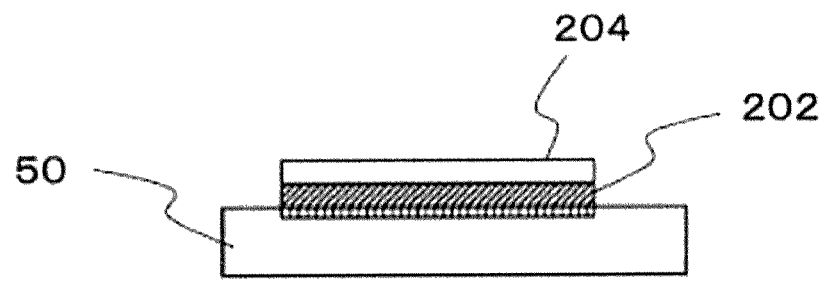

In contrast, in the printer 10 in this embodiment described by referring to FIG. 1A and FIG. 1B, the ink containing the exothermic polymerizable substance and the polymerization initiator is used to appropriately solve the disadvantageous circumstances described above. FIG. 2A to FIG. 2C are simplified (modeled) diagrams illustrating one example of the printing operation by the printer 10 in this embodiment (drying process model). FIG. 2A illustrates an exemplary operation of ejecting ink droplets onto the medium 50.

As described above, in printing by the printer 10 in this embodiment, the ultraviolet light sources 104, the print heater 22, and other components are employed for quickly evaporating the solvent in the ink. Thus, viscosity of the ink that has just landed on the medium 50 is increased at least to such a level that no ink bleeding occurs. In this case, as described above, it suffices that the heating temperature by the print heater 22 is at a level to, for example, maintain the temperature of the medium 50 at a value to meet the predetermined initial condition. Consequently, as compared with, for example, a case of drying the ink only by the print heater 22, it is ensured that the heating temperature by the print heater 22 is set at a lower value. The heating temperature by the print heater 22 refers to, for example, a heating temperature by the print heater 22 with respect to the region opposed to the inkjet heads 102.

In this case, even with the heaters such as the print heater 22, radiation heat generated by heating by the heaters such as the print heater 22 is decreased to eliminate or minimize drying of the ink on the nozzle surfaces of the inkjet heads 102, nozzle clogging, and such phenomena. As illustrated in FIG. 2A, in this embodiment, the ultraviolet light sources 104 emit ultraviolet light to the ink outside of the region on the medium 50 that is opposed to the inkjet heads 102. In this case, at the position on the medium 50 that is opposed to the inkjet heads 102, the solvent in the ink is evaporated relatively slowly only by heating by the print heater 22. This ensures that appropriate prevention of disadvantageous circumstances such as the evaporated solvent cohering and sticking to the inkjet heads 102. This also enhances steadiness of the ink ejection more appropriately.

More specifically, in this case, the ink, which has been ejected from the inkjet heads 102 and landed on the medium 50, is preliminarily heated in the region on the medium 50 that is opposed to the inkjet heads 102 to a relatively low temperature, for example, 70° C. or lower, or preferably, 60° C. or lower (for example, approximately 20° C. to 60° C.) by the print heater 22 before the ink is irradiated with ultraviolet light by the ultraviolet light sources 104. The heating temperature by the print heater 22 may be, for example, approximately at a value of temperature in a standard environment. Consequently, more preferably, the heating temperature by the print heater 22 is approximately 20° C. to 50° C., or even more preferably, approximately 20° C. to 45° C. Alternatively, the heating temperature by the print heater 22 may be, for example, approximately at a value of heating temperature by a print heater in a known low-speed printer that does not perform high-speed printing.

In this embodiment, the ultraviolet light sources 104 emit ultraviolet light to the vicinity of the region on the medium 50 that is opposed to the inkjet heads 102, so as to directly heat the ink in the vicinity region to evaporate the solvent in the ink quickly to increase viscosity of the ink. More specifically, in this case, as described above, at the time of the main scanning operation, the ultraviolet light sources 104 move in the main scanning direction along with the inkjet heads 102. In this case, the ultraviolet light source 104, which is on the rear side of the inkjet heads 102 in the movement direction, emits ultraviolet light to the ink on the medium 50.

This configuration ensures that, for example, the ultraviolet light source 104 emits ultraviolet light to each position on the medium 50 immediately after the inkjet heads 102 have passed by, so as to selectively cause only the ink that has landed to absorb the ultraviolet light. Thus, instead of heating the whole medium 50 to high temperature, only the ink layer on the medium 50 is selectively heated quickly. Such quick heating ensures that, for example, the viscosity of the ink is increased before ink bleeding occurs, so as to appropriately prevent ink bleeding. In this case, for example, since the viscosity of the ink is increased before a large amount of the ink is absorbed by the medium 50, the ink layer on the surface of the medium 50 does not become thinner.

In this case, as described above, the ultraviolet light source 104 emits ultraviolet light to the region that the inkjet heads 102 have just passed by. In the region to which the ultraviolet light is emitted, the solvent in the ink is quickly evaporated. The position where the solvent is evaporated, however, is displaced from the position of the inkjet heads 102 in such a manner that the inkjet heads 102 are not heated directly by the influence of heat radiation. That is, in this embodiment, for example, emitting the ultraviolet light while avoiding the region opposed to the inkjet heads 102 ensures that radiation heat and evaporation of the solvent caused by ultraviolet light emission from the ultraviolet light source 104 are appropriately prevented from affecting the inkjet heads 102. As a result, this embodiment also ensures that, for example, without hindering steady ejection of the ink, the viscosity of the ink is increased quickly after the ink has landed.

FIG. 2B is a cross-sectional view of one example of the medium 50 after completion of the printing operation (a print cross-sectional view after drying). FIG. 2B schematically illustrates an exemplary state of a printed layer 202, which is an ink layer formed on the medium 50 in a case of using a permeable medium as the medium 50. In this case, the permeable medium refers to a medium having a property of absorbing ink in a liquid state, such as paper and fabric.

As described above, this embodiment ensures that the ink is quickly dried after landing on the medium 50. Consequently, even in the case of using a permeable medium as the medium 50, the viscosity of the ink is increased before a large amount of the ink is absorbed by the medium 50, so as to quickly dry the ink in the vicinity of the surface of the medium 50. In this case, a permeation amount of the ink into the medium 50 is decreased (the ink permeates the medium 50 shallowly), and a large amount of the ink remains in the vicinity of the surface of the medium 50. This ensures that the ink, which remains as the printed layer 202 on the surface of the medium 50, has a sufficient thickness. Further, this ensures, for example, appropriate prevention of the printed color from becoming thin, so as to perform vivid printing having the ink color sufficiently deep. This leads to this embodiment that ensures more appropriate printing of the medium 50 while eliminating or minimizing ink bleeding and such phenomena.

Moreover, in this case, use of the ultraviolet light sources 104 and other components ensures that, for example, the ink is dried more reliably to decrease a remaining ratio and remaining time of the solvent that remains in the medium 50, which is the permeable medium. This also ensures appropriate prevention of cockling, curls, and such phenomena that may happen in a case of using the medium 50 of paper, for example.

In this embodiment, irradiation with ultraviolet light devolatilizes the solvent in the ink so as to more reliably dry the ink in a short time, as described above. This allows the medium 50 after printing to be quickly shifted to post-processing, for example. More specifically, in a case of employing the printer 10 having a configuration in which the medium 50 is wound up after printing, for example, this embodiment ensures appropriate prevention of disadvantageous phenomena such as ink setoff that may happen after winding up the medium 50 even in an apparatus such as a high-speed printer having an increased printing speed.

It should be noted that the inventor of the present application performed experiments, for example, to confirm that ultraviolet irradiation by the ultraviolet light sources 104 ensures that at least approximately 80% or more of the solvent in the ink is removed. In view of this, the configuration in this embodiment allows even the ultraviolet irradiation alone, for example, to remove most of the solvent in the ink so as to fix the ink on the medium 50. In the case of using the permeable medium, the ink may slightly permeate into the medium 50 even though the ultraviolet light sources 104 are used as in this embodiment. Even if the ink is slightly permeated, however, a permeation amount of the ink is significantly reduced as compared with the case where printing is performed with the conventional configuration without the ultraviolet light sources 104, for example.

The medium 50 used in the printer 10 in this embodiment is not limited to particular kinds. In the printer 10, therefore, it is considered to use the medium 50 having such a property that no ink is permeated into the medium 50 (impermeable medium or non-absorptive medium). In this case as well, it is ensured that the ultraviolet light sources 104 increase the viscosity of the ink to appropriately prevent phenomena such as ink bleeding. While eliminating or minimizing phenomena such as ink bleeding, this configuration enables appropriate printing of the medium 50.

As described above, conventionally, ultraviolet curable inks have been widely known as inks to be fixed on the medium 50 when irradiated with ultraviolet light. In a case of printing in ultraviolet curable inks, it has been known that the inks are to have an uneven surface and are more likely to have a matte surface.

In this respect, as in this embodiment, in the case of using the ink containing the exothermic polymerizable substance and the polymerization initiator as well, it is considered that when the ink, which has just landed, is irradiated with ultraviolet light, the exothermic polymerizable substance is polymerized in a short time to make a surface of the printed layer 202 on the medium 50 uneven to some degree. In this case, it is considered that unevenness of the surface of the printed layer 202 in this embodiment has such a degree that the surface has less matte texture as compared with the case of using ultraviolet curable inks. Depending on a demanded printing quality or other factors, however, there are cases in which it is demanded to reduce an influence of such unevenness to perform printing with high smoothness. In such a case, it is considered to form a clear layer 204, which is a layer of transparent clear ink, over the printed layer 202.

FIG. 2C is a cross-sectional view of another example of the medium 50 after completion of the printing operation, schematically illustrating an exemplary state in the case of forming the clear layer 204 over the printed layer 202 on the medium 50. In this case, the head unit 12 (see FIG. 1A and FIG. 1B) further includes an inkjet head to eject ink droplets of the clear ink. In this case, as the clear ink used for forming the clear layer 204 as well, the ink containing the exothermic polymerizable substance and the polymerization initiator, for example, is used. Ultraviolet light is emitted, for example, at a timing different from a timing at the time of forming the printed layer 202 so as to form the clear layer 204 while the ink layer is flattened (made smoother). When the surface of the printed layer 202 becomes uneven, for example, this configuration ensures that the smoothness of a printing result is appropriately increased.

It should be noted that the state in which the ink layer is flattened refers to, for example, a state in which ink dots that constitute the ink layer are flattened. In this case, time between landing of the ink droplets and ultraviolet irradiation is increased to form the clear layer 204 in the flattened state. It is considered that disadvantageous unevenness of the surface of the printed layer is more likely to occur, for example, in using the ink A described above. Consequently, particularly preferably, the clear layer 204 is formed on the printed layer 202 in the case of using the ink A. A configuration of the head unit 12 in the case of forming the clear layer 204 on the printed layer 202, and more specific operations in printing will be described in more detail later.

Next, features of the ink used in this embodiment will be described in more detail. As described above, in this embodiment, printing is performed in the drying-by-evaporation ink that is fixed on the medium 50 by evaporating the solvent in the ink. Also, as described above, the ink containing the exothermic polymerizable substance and the polymerization initiator is used to quickly evaporate the solvent in the ink by irradiating the ink with ultraviolet light. In this case, even when the ink contains a great amount of the solvent and even when a solvent that is difficult to evaporate only by heating by heaters is used, for example, the viscosity of the ink is appropriately increased before ink bleeding occurs.

In view of this, in this embodiment, as the solvent, a water-based solvent containing water as the main ingredient, for example, is suitably used. In this case, the ink may contain, for example, 50 weight % or more of the solvent. More specifically, it is considered to use the ink containing the solvent at a ratio of, for example, 20 weight % to 70 weight % of the total weight of the ink.

As such an ink, it is considered to use, for example, the inks A and B described above. In this case, the inks A and B each contain the solvent, the exothermic polymerizable substance, the polymerization initiator, and the colorant. In this case, as the exothermic polymerizable substance and other ingredients, it is considered to use substances suitable for use of each of the inks A and B.

As described above, when the ink A is irradiated with ultraviolet light, the exothermic polymerizable substance in the ink changes into resin owing to its polymerization reaction. The ink A is such an ink that the resin generated by polymerization of the exothermic polymerizable substance remains on the medium 50 after completion of printing. In this case, this resin, which remains on the medium 50 after completion of printing, retains the colorant on the medium 50, for example.

In the ink A, therefore, as the exothermic polymerizable substance, preferably, for example, a substance that generates UV curable resin with high transparency in the visible light range along with the exothermic polymerization reaction is used. As such an exothermic polymerizable substance, it is considered to use, for example, substances such as various kinds of UV polymerizable composites that cause radical polymerization reactions. In this case, for example, monomers such as dipropylene diacrylate, isobornyl acrylate, and methoxybutyl acrylate, and oligomers such as polyester acrylate, epoxy acrylate, and urethane acrylate may be suitably used. As the exothermic polymerizable substance, it is also considered to use, for example, substances such as various kinds of UV polymerizable composites that cause cationic polymerization reactions. In this case, for example, substances such as epoxy, vinylether, and oxetane may be suitably used. In the ink A, preferably, the content of the exothermic polymerizable substance is 25 weight % to 70 weight % of the total weight of the ink, for example.

As other ingredients, preferably, substances in accordance with the exothermic polymerizable substance, for example, are used. For example, in use of an exothermic polymerizable substance that causes a radical polymerization reaction, it is considered to use an acetophenone or acyloxime polymerization initiator, for example, as the polymerization initiator. In use of an exothermic polymerizable substance that causes a cationic polymerization reaction, it may be considered to use, as the polymerization initiator, a substance that reacts to light to generate acid and is capable of effectively absorbing ultraviolet light generated by the ultraviolet light sources 104, for example. In the ink A, preferably, the content of the polymerization initiator is, for example, 5 weight % to 10 weight % of the total weight of the ink.

In the ink A, it is considered to use, as the colorant, for example, a pigment, a disperse dye (sublimation dye), or both of the pigment and the disperse dye. In this case, preferably, the content of the colorant is, for example, 2 weight % to 10 weight % of the total weight of the ink. In addition to these ingredients, the ink A may contain various kinds of additives as necessary. In this case, it is considered to add, for example, an adjustment agent to adjust surface tension and viscosity of the ink.

It should be noted that in the ink A, when a pigment is used as the colorant, resin, which is generated by polymerization of the exothermic polymerizable substance, functions as a binder to retain the pigment. When a dye such as a disperse dye is used as the colorant, it is considered to perform, for example, processing for color development of the dye. In this case, as the medium 50, it is considered to use, for example, a polyester fabric. In this case, for example, the dye as well as the medium 50 is heated at a temperature of approximately 150° C. to 190° C. only for a predetermined period of time. Such processing, for example, appropriately causes a color development reaction to obtain a final color image as a printing result. In this case, preferably, the resin generated by polymerization of the exothermic polymerizable substance is polyester or urethane resin. This configuration ensures that, for example, the printing result is made more vivid. In this case, in order to obtain vivid color development more appropriately, more preferably, the resin after polymerization is colorless transparent resin.

When the ink B is irradiated with ultraviolet light, the exothermic polymerizable substance in the ink likewise changes into resin owing to its polymerization reaction. The ink B is an ink from which the resin is to be removed after irradiation with ultraviolet light and before printing completion. More specifically, in use of the ink B, it is considered to remove the resin in post-processing after detaching the medium 50 from the printer 10 (see FIG. 1A and FIG. 1B), for example. In this case, it is considered to use, as the exothermic polymerizable substance, a composite that generates water-soluble ultraviolet curable resin (water-soluble exothermic UV polymerization composite) along with an exothermic polymerization reaction, and to wash the medium 50 in water to remove the resin. In this case, it is considered to use, as the medium 50, a water-washable medium such as fabric. As the water-soluble ultraviolet curable resin, a water-soluble thermoplastic compound is preferable.

In the ink B as well, a substance identical with or similar to the exothermic polymerizable substance in the ink A may be used as the exothermic polymerizable substance. In the ink B as well, preferably, the content of the exothermic polymerizable substance is 25 weight % to 70 weight % of the total weight of the ink, for example. As other ingredients, preferably, substances in accordance with the exothermic polymerizable substance used, for example, are used. Consequently, in the ink B as well, substances identical with or similar to the polymerization initiator and other ingredients in the ink A may be used as the polymerization initiator or other ingredients. In the ink B as well, preferably, the content of the polymerization initiator is 5 weight % to 10 weight % of the total weight of the ink, for example.

In use of the ink B, as described above, it is considered to use, for example, a fabric medium 50. In the ink B, it is considered to use a colorant having such a property that the colorant remains on the medium 50 after removing the resin. In view of this, in the ink B, preferably, a dye, for example, is used as the colorant. In this case, as the dye, a reactive dye, an acid dye, a disperse dye, a vat dye, and other dyes may be suitably used. In this case as well, preferably, the content of the colorant is 2 weight % to 10 weight % of the total weight of the ink, for example. In addition to these ingredients, the ink B may also contain various kinds of additives as necessary. In this case, it is considered to add, for example, an adjustment agent to adjust surface tension and viscosity of the ink.

Next, printing operations in the inks A and B will be described in more detail. For example, a description will be made as to how to emit ultraviolet light by the ultraviolet light sources 104. FIG. 3 is a table showing relationships between energies of ultraviolet light emitted to the inks (UV irradiation energies) and states of the inks. With the UV irradiation energies being made different to have various values, the table shows exemplary ink states in using the inks A and B as compared with using a known ultraviolet curable ink and a known SUV ink.

Among the cases compared in the table, in use of the ultraviolet curable ink and the SUV ink, the inks are cured when irradiated with ultraviolet light so as to fix the inks on the medium. In contrast, in use of the inks A and B, ultraviolet irradiation has a different purpose, that is, ultraviolet irradiation is performed to implement instantaneous drying to dry the solvents in the inks in a short time. This purpose difference causes use of the inks A and B to have other differences from use of the ultraviolet curable ink and the SUV ink in, for example, whether the heater is necessary, how to use the heater, and how the inks are irradiated with ultraviolet light.

More specifically, the ultraviolet curable ink is a solvent-free ink without a harmful solvent such as an organic solvent. In this case, in the operation for fixing the ink on the medium, there is no need to evaporate the solvent. In this case, therefore, as shown in the table, the print heater to heat the medium at the position opposed to the inkjet heads is normally unnecessary.

The ultraviolet curable ink is an ink applicable to various media. In order to print various media at high speed without causing ink bleeding, it is necessary to cure the ink quickly after the ink has landed. In view of this, the ultraviolet curable ink is adjusted to have such a high sensitivity to ultraviolet light that the ink is cured by a UV irradiation energy of, for example, approximately 200 mJ/cm$^2$ or less. In the case of the ultraviolet curable ink, therefore, as shown in the table, the UV irradiation energy and the ink state have such a relationship that cure (UV cure) of the ink is completed with the UV irradiation energy of, for example, 100 mJ/cm$^2$ to 200 mJ/cm$^2$, and that irradiation with ultraviolet light of a UV irradiation energy exceeding this range results in phenomena such as scorching of the medium and the ink, and damage on the medium.

As described above, the ultraviolet curable ink is advantageous in that it is a solvent-free ink and printable on various media at high speed without causing ink bleeding. In the meanwhile, however, curing the ink in a short time makes a layer of the ink uneven to such a degree that the printed surface becomes a matte surface to unfortunately lose glossiness. In order to obtain glossiness, it is also considered to delay ultraviolet irradiation, for example. In this case, however, ink bleeding is more likely to occur to make it difficult to perform high-resolution printing.

In this connection, the SUV ink is an ink developed to compensate for the above-described defects of the ultraviolet curable ink. The SUV ink is, so to speak, a solution of an ultraviolet curable ink diluted with a solvent (organic solvent). Addition of the solvent realizes a condition for readily flattening ink dots so as to reduce the thickness of the ink. Thus, with the ink being irradiated with ultraviolet light and fixed on the medium, glossiness is appropriately enhanced.

In use of the SUV ink in accordance with these features of the ink, the print heater to heat the medium at the position opposed to the inkjet heads is required to evaporate the solvent in the ink. In this case, in a manner different from the printer 10 in this embodiment described by referring to, for example, FIG. 1A and FIG. 1B, the heating temperature of the print heater is set at such a value that the solvent is devolatilized only by the print heater. In this case, however, when the heating temperature of the print heater is too high, nozzle clogging or such disadvantageous phenomena occur. Consequently, the heating temperature of the print heater is set at a value in a range that prevents disadvantageous phenomena such as nozzle clogging from occurring, and accordingly, it takes some length of time deliberately to evaporate the solvent.

More specifically, in the experiment to obtain the results shown in the table, intensity of the UV irradiation energy is adjusted by changing time for irradiation with ultraviolet light. This makes the intensity of the UV irradiation energy proportional to the time for irradiation with ultraviolet light. In this case, during irradiation with ultraviolet light, heating by the print heater is continued. In the results shown in the table, therefore, a high intensity of the UV irradiation energy also corresponds to long heating time by the print heater.

In the results shown in the table, when the UV irradiation energy is 600 mJ/cm$^2$ to 1000 mJ/cm$^2$, almost all the solvent is evaporated, and the ink is fixed without ink bleeding. When the UV irradiation energy is 2000 mJ/cm$^2$ to 4000 mJ/cm$^2$, the ink is completely dried and fixed on the medium. From these results, it may be considered that, as described above, heating is performed by the print heater only for a period of time in accordance with the UV irradiation energy of each intensity so as to evaporate the solvent in the ink.

As described above, the SUV ink is a solution of an ultraviolet curable ink diluted with a solvent. In this case, disregarding an influence of the solvent, it is considered that the SUV ink is fixed by irradiating the ink with ultraviolet light having the same level of the UV irradiation energy as in the case of the ultraviolet curable ink. Therefore, in this respect as well, the results in the table may be considered to reveal the influence of heating by the print heater for a period of time corresponding to each range of intensity of the UV irradiation energy.

From such a feature, it may be considered that in the case of the SUV ink, somewhat long time is deliberately taken until almost all the solvent is evaporated, for example, so as to flatten dots of the ink. In this case, however, similarly to the case in which a drying-by-evaporation ink such as a water-based ink and a solvent ink is used in the printer of the conventional configuration, as the amount (landing amount) of the ink that lands in a unit area per unit time is increased, ink bleeding is more likely to occur. Consequently, similarly to decreasing the number of passes of printing in a case of serial printing in which the inkjet heads perform main scanning operations, for example, increasing the printing speed unfortunately results in occurrence of ink bleeding.

In contrast, this embodiment implements the configuration in which inks such as the inks A and B are used to utilize heat generated by the exothermic polymerizable substance to evaporate the solvents in the inks in a short time so as to eliminate or minimize ink bleeding. More specifically, in this case, in the printer 10, the preheater 20 and the print heater 22 (see FIG. 1A and FIG. 1B) are arranged to adjust and maintain the initial condition of ultraviolet irradiation, but are not essential structures to evaporate the solvents in the inks. In this embodiment, therefore, compositions of the inks A and B, and how to emit ultraviolet light by the ultraviolet light sources 104 are set to enable printing without the print heater 22 and other components. In this case, to enable printing without the print heater 22 and other components refers to enabling printing substantially without causing ink bleeding, for example, in a case where the environment including room temperature is standard (for example, room temperature is approximately 25° C.). In this case, the configuration in this embodiment may be regarded as a configuration to perform printing under such a condition that the solvent is not sufficiently evaporated only by the print heater 22 in a manner different from the case of using the SUV ink, for example.

More specifically, in the results shown in the table, in use of the inks A and B, when the UV irradiation energy is 200 mJ/cm$^2$ to 600 mJ/cm$^2$ in a state without the print heater 22, almost all the solvent is evaporated, and the ink is fixed without ink bleeding. When the UV irradiation energy is 600 mJ/cm$^2$ or more, the ink is completely dried.

In view of this, the case of using the inks A and B may be considered to be different from the case of using the ultraviolet curable ink, for example, in respect of evaporating the solvent in the ink. Moreover, the case of using the inks A and B may be considered to be different from the case of using the SUV ink in that without using the print heater 22, it is ensured that the ink is fixed without causing ink bleeding. Also, the case of using the inks A and B may be considered to be different from the case of using the SUV ink in that ultraviolet irradiation solely ensures that the ink is dried in a shorter time than in the case of using the SUV ink.

In use of the inks A and B, since it is ensured that the ink is dried in a short time, printing is appropriately performed while eliminating or minimizing ink bleeding even in a case of, for example, decreasing the number of passes in printing. More specifically, even in a case where the number of passes is 1 to increase the printing speed (a case of single-pass printing), for example, it is ensured that printing is appropriately performed while eliminating or minimizing ink bleeding. Further, in this case, as compared with, for example, use of the ultraviolet curable ink, use of the ink containing the solvent makes dots of the ink flatter to implement printing with higher glossiness. In use of an aqueous solvent, for example, since the main ingredient of the ink is water, it is ensured that loads on the environment are appropriately reduced as compared with a case of using an ink such as the SUV ink containing an organic solvent.

In this embodiment, it is ensured that the ink is dried in a short time. Consequently, in a case of using, for example, a medium to be wound up after printing, high-speed winding is ensured. In other respects, the ink is dried efficiently and reliably to appropriately eliminate or minimize various disadvantageous phenomena caused by the remaining ink.

It should be noted that as a factor to be a disadvantage in use of the inks A and B, need to take measures to eliminate or minimize banding in serial printing, for example, is considered. This disadvantage, however, is not caused by using the inks A and B but caused by serial printing. Preferably, therefore, such a disadvantage is optionally addressed as necessary in a manner identical with or similar to a case of a known printer for serial printing.

As described above, in use of the inks A and B, the heat generated by the exothermic polymerizable substance is utilized to effectively heat the ink. In this regard, the inventor of the present application made a thorough examination on, for example, heating inks only by utilizing heat generated by absorption of ultraviolet light before using inks containing the exothermic polymerizable substance such as the inks A and B. In this case, without using the exothermic polymerizable substance, the inks are heated by adding to the inks ultraviolet light absorbents to absorb ultraviolet light to generate heat. As such an ultraviolet light absorbent, for example, a substance identical with or similar to the polymerization initiator in the inks A and B is used. In this case, however, as compared with, for example, the inks A and B, the amount of generated heat with respect to the same irradiation amount of ultraviolet light is decreased to hinder drying of the ink. More specifically, for example, an ink having the same composition as the inks A and B except the exothermic polymerizable substance was used and subjected to ultraviolet irradiation under the same conditions shown in the table. In this case, when the UV irradiation energy of 200 mJ/cm$^2$ to 600 mJ/cm$^2$ was merely applied to the ink containing no exothermic polymerizable substance, evaporation of the solvent was incomplete, and sufficient fixation of the ink was not obtained. In this case, when the UV irradiation energy of 800 mJ/cm$^2$ to 2000 mJ/cm$^2$ was applied, almost all the solvent was evaporated to implement fixation of the ink without ink bleeding. Further, when the UV irradiation energy of 2900 mJ/cm$^2$ to 4000 mJ/cm$^2$ was applied, the ink was completely dried and fixed.

Use of such an ink also makes dots of the ink flatter as compared with use of the ultraviolet curable ink, for example. Use of the aqueous solvent, for example, which contains water as the main ingredient, ensures that loads on the environment is appropriately reduced. Use of this kind of ink, however, causes need to take more time to evaporate the ink. Consequently, when printing is performed at high speed, for example, ink bleeding is more likely to occur. In the case of the configuration of winding up the medium after printing, for example, high-speed winding becomes difficult.

In contrast, as compared with such an ink, it is understood that the inks A and B have sensitivity to ultraviolet light significantly enhanced by utilizing the heat generated by the exothermic polymerizable substance. This embodiment, therefore, ensures that the solvent in the ink is evaporated more quickly and more efficiently, for example. In this case, since there is no need to excessively increase the UV irradiation energy, it is also ensured that various disadvantageous phenomena that may be caused by irradiation with too intense ultraviolet light are eliminated or minimized. This embodiment, therefore, ensures that without scorching the ink and the medium, for example, printing with high flatness is more appropriately performed.

As shown in the table concerning the case of using the ultraviolet curable ink, in irradiating the ink and the medium with ultraviolet light, an excessive amount of ultraviolet irradiation may cause scorching or such phenomena of the ink and the medium. As in this embodiment, therefore, in which the solvent in the ink is evaporated by ultraviolet irradiation, preferably, the ink is irradiated with ultraviolet light within a range not to make the amount of ultraviolet irradiation excessive. More specifically, in this case, when intense ultraviolet light is continuously emitted even after the solvent in the ink is completely evaporated, the ink and the medium are more likely to be scorched. In view of this, in irradiation with ultraviolet light by the ultraviolet light sources 104, it is also considered that the ink is irradiated with ultraviolet light, for example, within a range not to completely evaporate the solvent in the ink. This configuration ensures appropriate prevention of phenomena such as scorching of the ink and the medium. In this case as well, reducing the amount of the solvent that remains after irradiation with ultraviolet light appropriately and sufficiently ensures appropriate prevention of ink bleeding or such phenomena. In this case, preferably, the remaining solvent is evaporated by the afterheater or such a device.

Next, supplementary descriptions as to the printer 10 in this embodiment and descriptions of modifications of this embodiment, for example, will be given. First, features of the ink used in this embodiment will be supplementarily described.

As described above, the ink used in the printer 10 in this embodiment contains ingredients such as the exothermic polymerizable substance and the polymerization initiator. Through various experiments, the inventor of the present application found that heat generated by the exothermic polymerizable substance is utilized to efficiently evaporate the solvent in the ink, and invented the configuration in which such an ink is used. In this connection, when attention is only paid to a basic composition of the ink, such an impression is considered to be given that the ink in this embodiment such as the inks A and B is apparently similar to known SUV inks, for example.

As understood from the preceding description, however, when attention is paid to how to fix the ink on the medium, for example, there is an obvious difference between the ink in this embodiment and known SUV inks. More specifically, SUV inks are used for, for example, printing with particularly high glossiness. In this case, in order to sufficiently flatten dots of an SUV ink, some length of time is deliberately taken to fix the ink on the medium.

In contrast, in the case of the ink in this embodiment, as compared with use of SUV inks, for example, the ink is irradiated with intense ultraviolet light in a shorter time to evaporate most of the solvent. More specifically, in this case, the ultraviolet light sources 104 (see FIG. 1A and FIG. 1B) irradiate the ink, which has just landed on the medium, with ultraviolet light of 200 mJ/cm$^2$ or more in 2 seconds or less after landing, for example. Thus, at least 50 weight % or more of the solvent in the ink is evaporated. In this case, evaporating at least 50 weight % or more of the solvent in the ink refers to evaporating a weight ratio 50% or more of the weight of the solvent in the ink.

Time from landing of the ink until irradiation with a predetermined amount of ultraviolet light is, preferably, 1 second or less, or more preferably, 0.5 second or less. The predetermined amount of ultraviolet light emitted in this time is, preferably, 600 mJ/cm$^2$ or more, or more preferably, 1000 mJ/cm$^2$ or more, or even more preferably, 2000 mJ/cm$^2$ or more. The amount of the solvent evaporated by irradiation with the predetermined amount of ultraviolet light in this time is, preferably, 70 weight % or more, or more preferably, 80 weight % or more of the solvent in the ink.

In this case, since irradiation with ultraviolet light enables quick evaporation of the solvent in the ink in a short time (instantaneous heating and drying), it is ensured that the ink is fixed before ink bleeding occurs. Consequently, even in a case of increasing the amount of the ink that lands in a unit area per unit time, for example, appropriate prevention of ink bleeding is ensured. This further ensures that the number of passes in printing is decreased, for example, to perform high-speed printing.

More specifically, with a configuration for printing with high resolution (for example, 600 dpi or more) that has been demanded recently, suppose using a conventional drying-by-evaporation ink, for example. In such a case, in order to eliminate or minimize ink bleeding, normally, the number of passes in printing is made equal to or larger than 16 (approximately 16 to 32, for example) in general. In contrast, in this embodiment, even in a case of decreasing the number of passes, appropriate prevention of ink bleeding is ensured. In view of this, in this embodiment, it is considered that the number of passes in printing is made equal to or less than 8, for example. This configuration ensures, for example, increasing the printing speed appropriately. Alternatively, the number of passes may be made less than 8 (equal to or less than 4, for example). Alternatively again, it is also considered that the number of passes is made to be 1, for example. In use of an ink having a low drying speed, for example, printing may be performed with a larger number of passes. In this case, it is considered to perform printing with 16 passes or less, for example.

In this embodiment, since it is ensured that the solvent in the ink is efficiently evaporated in a short time, a solvent with low volatility, for example, may be used as the solvent. More specifically, in a case of a conventional solvent UV ink, normally, an organic solvent such as a volatile organic solvent, for example, is used as the solvent. In contrast, it is ensured that in the ink in this embodiment, an aqueous solvent such as water is suitably used as the solvent. Thus, as described above, as compared with use of the SUV ink, for example, loads on the environment are appropriately eliminated or minimized. Alternatively, depending on a demanded printing quality, for example, the ink in this embodiment should not be necessarily limited to the aqueous solvent but may contain an organic solvent, for example, as the solvent. In this case, it is also considered to use, for example, a solvent with low volatility such as an organic solvent having a boiling point of 100° C. or higher.

As a difference between known SUV inks and the ink in this embodiment, it may be considered whether the print heater is essential. More specifically, in use of an SUV ink, it is considered that normally, mere irradiation with ultraviolet light causes ink bleeding, which hinders appropriate printing. Consequently, in use of the SUV ink, the print heater is an essential component in a printer. In contrast, in use of the ink in this embodiment, as described above, the print heater and such devices are used for adjusting and maintaining the initial condition of ultraviolet irradiation. Therefore, in a standard environment including room temperature, for example, even when the print heater and such devices are not used, printing is ensured substantially without causing ink bleeding.

Next, modifications of the printer 10 and the printing operation will be described. As described above, in this embodiment, the ink is irradiated with intense ultraviolet light immediately after the ink has landed so as to prevent ink bleeding. In this case, however, as compared with use of the known SUV ink, for example, smoothness of printing results may be degraded.

In this regard, as described above by referring to FIG. 2C, for example, in the modifications of the printer 10 and the printing operation, it is also considered that the inkjet head for the clear ink is additionally used to form the clear layer on the printed layer on the medium. With this configuration, even if the surface of the printed layer becomes uneven, for example, smoothness of a printing result is appropriately enhanced.

Figure 4A:
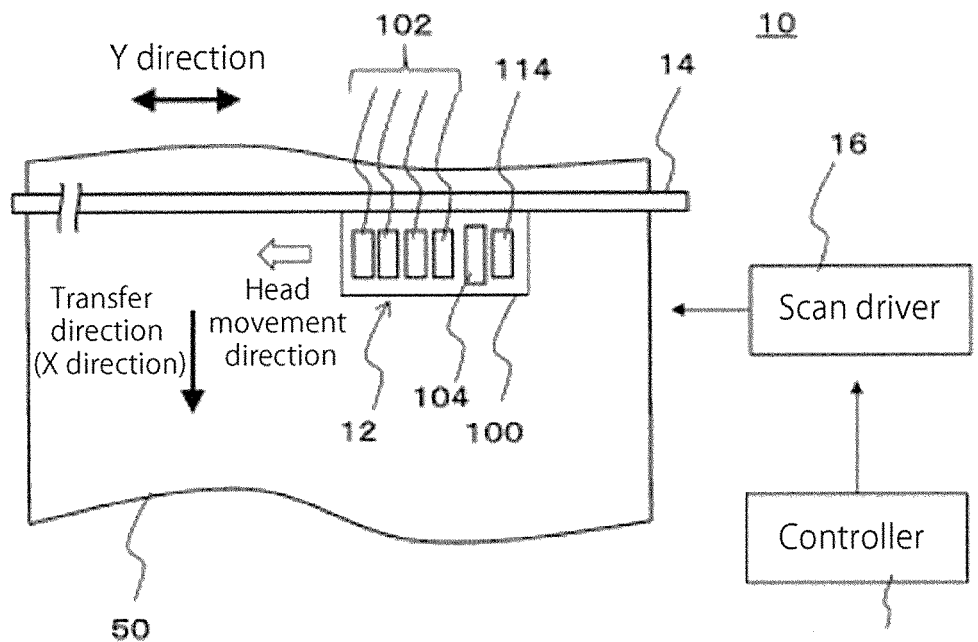
Figure 4B:
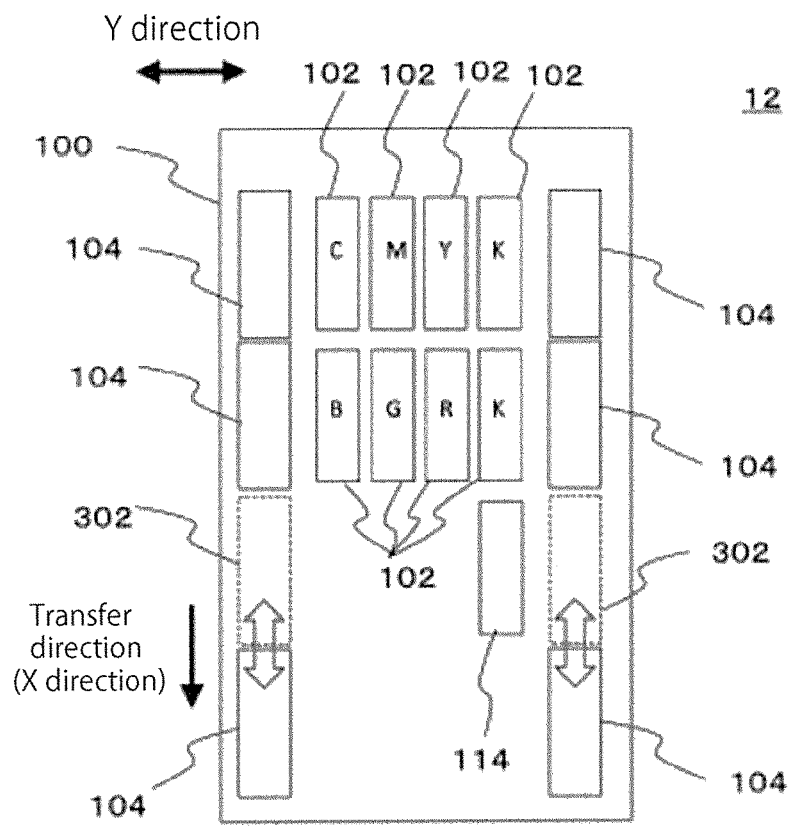

In this case, preferably, a configuration of the head unit 12 in the printer 10, for example, is made different from the configuration illustrated in FIG. 1A and FIG. 1B. FIG. 4A and FIG. 4B are diagrams illustrating modifications of the configuration of the printer 10. It should be noted that except for those respects to be described below, in FIG. 4A and FIG. 4B, components denoted with the same reference numerals and symbols as in FIG. 1A to FIG. 3 have features identical with or similar to the features of the components illustrated in FIG. 1A to FIG. 3.

FIG. 4A illustrates one example of the modifications of the configuration of the printer 10. In this modification, the printer 10 includes the head unit 12 having a configuration partially different from the configuration illustrated in FIG. 1A and FIG. 1B. More specifically, the head unit 12 includes the plurality of inkjet heads 102, the ultraviolet light source 104, and an inkjet head 114.

The plurality of inkjet heads 102 are inkjet heads for color inks, and eject ink droplets of the inks of the colors Y, M, C, and K. The ultraviolet light source 104 is a light source to irradiate the inks with ultraviolet light. As the plurality of inkjet heads 102 and the ultraviolet light source 104, for example, the inkjet heads 102 and the ultraviolet light source 104 having configurations identical with or similar to the configurations illustrated in FIG. 1A and FIG. 1B may be suitably used. Among the inkjet heads 102 in the head unit 12, the inkjet heads 102 of the colors Y, M, and C are exemplary color inkjet heads to eject ink droplets of chromatic color inks.

In this modification, the plurality of inkjet heads 102 each eject ink droplets of, for example, the ink A described above. The ultraviolet light source 104 has an arrangement different from the arrangement illustrated in FIG. 1A and FIG. 1B. More specifically, in this modification as well, the plurality of inkjet heads 102 are disposed side by side in the main scanning direction at positions aligned in the sub-scanning direction. Meanwhile, the ultraviolet light source 104 is disposed only on one side of the arrayed plurality of inkjet heads 102 in the main scanning direction, as illustrated in FIG. 4A. In this case, the plurality of inkjet heads 102 in the head unit 12 only perform a main scanning operation in one direction (unidirectionally) in which the ultraviolet light source 104 is on the rear side of the inkjet heads 102. This direction is indicated by the outlined arrow "head movement direction" in FIG. 4A. In this case, at the time of the unidirectional main scanning operation (first half of reciprocation), the ultraviolet light source 104 irradiates the color inks ejected from the inkjet heads 102 with ultraviolet light immediately after the inks have landed. Consequently, in this modification as well, using the color inks of the plurality of colors ensures appropriate formation of a printed layer on which a color image is printed.

In the head unit 12 in this modification, the inkjet head 114 is an exemplary clear ink head and ejects ink droplets of the clear ink. In this case, as the clear ink as well, an ink containing the exothermic polymerizable substance and the polymerization initiator, for example, is used. As such a clear ink, for example, an ink identical with or similar to the ink A except for containing no colorant may be suitably used. In this modification, the inkjet head 114 is disposed on the side of the ultraviolet light source 104 that is opposite to the plurality of inkjet heads 102 side. With the ultraviolet light source 104 being interposed therebetween, the inkjet head 114 and the plurality of inkjet heads 102 are juxtaposed in the main scanning direction at positions aligned in the sub-scanning direction.

With this configuration, at the time of each main scanning operation, the inkjet head 114 is to eject ink droplets of the clear ink onto a position by which the ultraviolet light source 104 has just passed. Consequently, during the main scanning operation concerned, the clear ink that has just landed is not irradiated with ultraviolet light. In this case, after each main scanning operation, for example, the clear ink that has landed is irradiated with ultraviolet light at the time of return (second half of reciprocation) when the head unit 12 is moved reversely in the main scanning direction. This configuration ensures that at the time of forming the clear layer, for example, the timing to irradiate the ink with ultraviolet light is made appropriately different from the timing at the time of forming the printed layer.

In this case, the inkjet head 114 ejects ink droplets of the clear ink onto the ink, which has been ejected by the inkjet heads 102 and irradiated with ultraviolet light by the ultraviolet light source 104. Thus, the inkjet head 114 forms the clear layer covering the image depicted on the printed layer in chromatic color inks of the colors such as Y, M, C, and K. This configuration ensures that the printed layer and the clear layer are appropriately formed on the medium, for example.

In this case, at the time of forming the clear layer, a state in which the solvent in the clear ink is not removed continues to flatten dots of the ink until the ink is irradiated with ultraviolet light. Consequently, this modification ensures that the clear layer is formed, for example, with the ink layer being made flatter (smoother). This further ensures that high-glossiness printing is performed more appropriately.

In a modification of how to cure the clear ink, it is also considered that after a main scanning operation in which the inkjet head 114 ejects ink droplets of the clear ink onto each position on the medium 50, the clear ink is irradiated with ultraviolet light at the time of another main scanning operation, for example, so as to cure the clear ink. In multi-pass printing, for example, it is also considered to irradiate the clear ink with ultraviolet light at a next main scanning operation (next pass) of ejecting ink droplets onto the same position.

As a feature of this modification, for example, it is also considered that the configuration of forming the clear layer of the clear ink by the inkjet head 114 makes the printed surface of the medium 50 after printing glossier as compared with a case without forming the clear layer. The configuration for printing in this manner should not be limited to the configuration illustrated in FIG. 4A but further modifications may be considered.

FIG. 4B illustrates an exemplary configuration of the head unit 12 in another modification of the printer 10. In this modification, the plurality of inkjet heads 102 in the head unit 12 perform bidirectional main scanning operations in a manner similar to the case of the configuration illustrated in FIG. 1A and FIG. 1B. For this purpose, the head unit 12 includes the ultraviolet light sources 104 on one side and on the other side of the array of the plurality of inkjet heads 102 in the main scanning direction. In this modification, in addition to the inkjet heads 102 of the colors Y, M, C, and K, the head unit 12 further includes inkjet heads 102 of colors R, G, and B. As illustrated in FIG. 4B, the inkjet heads 102 of the colors R, G, and B are disposed side by side in the main scanning direction at positions displaced from the inkjet heads 102 of the colors Y, M, and C in the sub-scanning direction. In this case, in addition to the inkjet head 102 of the color K disposed side by side with the inkjet heads 102 of the colors Y, M, and C, another inkjet head 102 of the color K is disposed side by side with the inkjet heads 102 of the colors R, G, and B. In this case, as illustrated in FIG. 4B, the plurality of ultraviolet light sources 104 are disposed in such an arrangement that a region where the inkjet heads 102 of the colors Y, M, C, K, R, G, and B are disposed is interposed between the plurality of ultraviolet light sources 104 in the main scanning direction.

In this modification, the inkjet head 114 is disposed at a position displaced from the inkjet heads 102 of the colors Y, M, C, K, R, G, and B in the sub-scanning direction to cause the inkjet head 114 to be opposed to each position on the medium 50 at a timing later than the inkjet heads 102 of the colors Y, M, C, K, R, G, and B. Thus, the inkjet head 114 forms the clear layer on the printed layer.

In this case, as illustrated in FIG. 4B, for example, the ultraviolet light sources 104 to irradiate with ultraviolet light the clear ink ejected by the inkjet head 114 are disposed on one side and on the other side of the inkjet head 114 in the main scanning direction at positions further displaced from the inkjet head 114 in the sub-scanning direction. Thus, after the inkjet head 114 performs a main scanning operation of ejecting ink droplets of the clear ink onto each position on the medium 50, the ultraviolet light sources 104 irradiate the clear ink with ultraviolet light at the time of another main scanning operation, for example. This configuration also ensures that the clear layer is formed, with the ink layer being made flatter. This ensures, for example, more appropriate performance of high-glossiness printing.

It should be noted that it is also considered to make the ultraviolet light sources 104 to irradiate the clear ink with ultraviolet light have an irradiation intensity of the ultraviolet light lower than the ultraviolet light sources 104 to irradiate the inks of the colors Y, M, C, K, R, G, and B with ultraviolet light, for example. This configuration ensures that time until the solvent in the clear ink is evaporated is adjusted to be longer. This ensures that the clear layer is formed, with the ink layer being made flatter, for example. Alternatively, in this case, as indicated with the dashed lines 302 in FIG. 4B, for example, the ultraviolet light sources 104 for the clear ink are also considered to be disposed at positions aligned with the inkjet head 114 in the sub-scanning direction. As another alternative, the ultraviolet light sources 104 for the clear ink are also considered to be disposed at positions variable in the sub-scanning direction, for example, as indicated by the arrow in FIG. 4B. This configuration ensures that in accordance with a demanded printing quality, for example, the way to form the clear layer is adjusted in various manners.

In the above-described modification, the clear layer, which is a different layer, is formed on the printed layer. Alternatively, in a further modification of the configuration of the printer 10, it is also considered to form a different layer not on the printed layer but under the printed layer, for example.

Figure 5A:
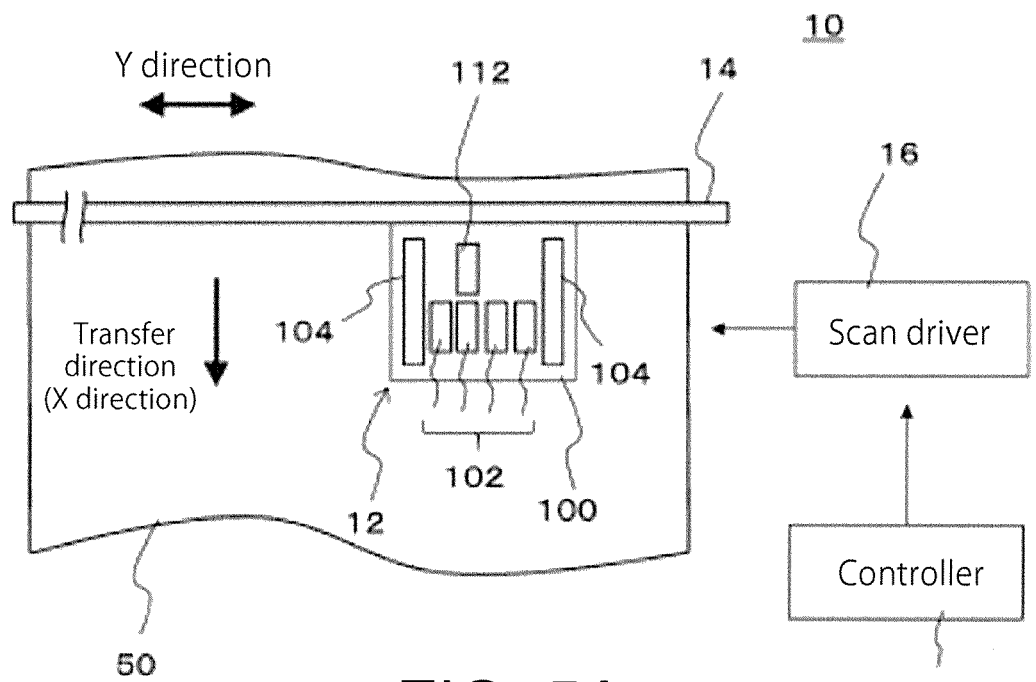
FIG. 5A and FIG. 5B illustrate a further modification of the configuration of the printer 10, and are respectively a plan view and a cross-sectional view of an essential part of the printer 10, illustrating its exemplary configuration.
Figure 5B:
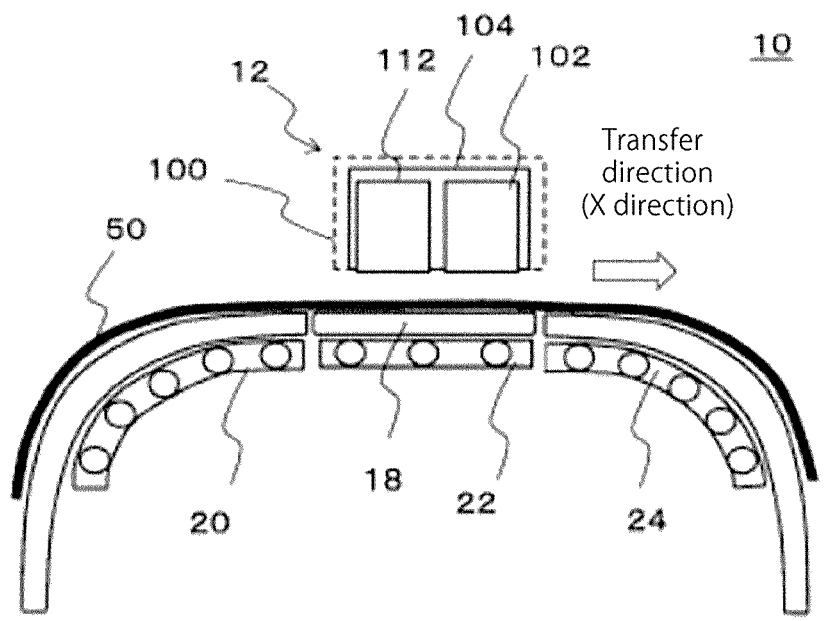

FIG. 5A and FIG. 5B illustrate the further modification of the configuration of the printer 10. FIG. 5A and FIG. 5B are respectively a plan view and a cross-sectional view of essential components of the printer 10 in this modification, illustrating examples of their configurations. It should be noted that except for those respects to be described below, in FIG. 5A and FIG. 5B, components denoted with the same reference numerals and symbols as in FIG. 1A to FIG. 4B have features identical with or similar to the features of the components illustrated in FIG. 1A to FIG. 4B.

In this modification, the printer 10 additionally uses a pretreatment inkjet head 112 to perform pretreatment of the medium 50 so as to print the medium 50. More specifically, in this modification, the head unit 12 further includes the pretreatment inkjet head 112. The inkjet head 112 ejects ink droplets of a pretreatment ink, which is an ink containing a pretreatment agent in accordance with a pretreatment purpose. In this case, the inkjet head 112 is disposed at a position displaced from the inkjet heads 102 of the colors in the sub-scanning direction to cause the inkjet head 112 to be opposed to each position on the medium 50 at a timing before the inkjet heads 102 of the colors used to form the printed layer. This configuration ensures that each position on the medium 50 undergoes pretreatment before formation of the printed layer.

In this case, as the pretreatment ink as well, it is considered to use an ink containing the exothermic polymerizable substance and the polymerization initiator, which ink is similar to the inks A and B. In this case, as illustrated in FIG. 5A and FIG. 5B, the ultraviolet light sources 104 are disposed to also irradiate with ultraviolet light positions on the medium 50 overlapping the inkjet head 112 in the sub-scanning direction. More specifically, in the printer 10 to perform bidirectional main scanning operations, for example, it is preferable that the ultraviolet light sources 104 be disposed to emit ultraviolet light at positions on both sides of the inkjet head 112 in the main scanning direction. This configuration ensures that before ink droplets are ejected onto each position on the medium 50 from the inkjet heads 102, for example, the pretreatment ink is appropriately dried.

It should be noted that as the pretreatment ink, it is considered to use an auxiliary agent for developing a color of each color ink and a mordant, for example. In this case, the inkjet heads 102 eject ink droplets of inks containing dyes as the colorants, for example. As the pretreatment for the medium 50, it is also considered to perform treatment to prevent ink bleeding, for example.

The configuration and the printing operation of the printer 10 should not be limited to the above-described examples but other various modifications and applications are possible. For example, color inks for use in the printer 10 should not be limited to the inks of the colors Y, M, and C but inks of the colors Y, M, C, R, G, and B and inks of various features may be used. As the inks of various features, it is considered to use inks of various colors such as white, pearl, and metallic color. The number of colors of inks for use in the printer 10 should not be limited to a particular number, but it suffices that at least one color ink is used.

As the medium to be printed as well, various media may be used. In this case, since it is ensured that the solvent in the ink is evaporated without causing ink bleeding, high-speed printing is appropriately performed with respect to media that are more likely to cause ink bleeding when printed with a conventional configuration. In this case, fabric (such as dishcloths) without pretreatment and paper on which no image receiving layer is formed may be used. This ensures that running cost of printing is significantly reduced, for example. In use of permeable media, it is also considered to use porous media, for example, other than fabric and paper. As the medium, it is also considered to use sewn products such as T-shirts, for example. Depending on a demanded printing quality or other factors, it is also considered to use media that have undergone pretreatment, for example.

Alternatively, as the medium, it is also considered to use non-permeable media, for example, that are more likely to cause a conventional solvent ink to bleed and that are unusable. In this case, it is considered to use plastic film (such as PET and PC) and vinyl chloride sheets with non-permeability, for example. In use of such media as well, it is ensured that the ink is quickly dried to appropriately eliminate or minimize ink bleeding.

The configurations of the components of the printer 10, for example, may be also changed in various manners. The above description mainly refers to the configuration of the printer 10 for serial printing. In a modification of the configuration of the printer 10, however, line-at-a-time printing, for example, may be performed. In this case, the ultraviolet light sources 104 are disposed at positions on the rear side (downstream side) of the inkjet heads 102 in the medium transfer direction, for example. This configuration also ensures that the ink on the medium is dried quickly and appropriately. Thus, ink bleeding is eliminated or minimized to appropriately perform high-speed printing.

Next, supplementary descriptions will be added to the above-described configurations. As described above, the inventor of the present application made examinations for increasing efficiency of evaporation of the solvent in the ink, and introduced the technical innovations described above. More specifically, the inventor considered that in the configuration of irradiating the drying-by-evaporation ink with ultraviolet light to dry the ink, in order to perform photo-thermal conversion to convert the energy of ultraviolet light into thermal energy more effectively, substances to cause exothermic reactions in response to ultraviolet light, for example, are added to the ink by dispersing or dissolving the substances in the solvent so as to utilize energy of generated heat to evaporate the solvent in the ink. In order to increase the speed of heating with this configuration, the inventor considered utilizing heat generated by the exothermic polymerizable substance to heat the solvent. Through the experiments performed with this configuration, for example, the inventor actually made the ink absorb ultraviolet light and found that highly efficient photo-thermal conversion is implementable. This configuration ensures that without increasing the temperatures of components such as the platen and the inkjet heads, for example, only the drying-by-evaporation ink is heated in an instant to evaporate the solvent. This makes implementable a high-speed drying system for drying the ink with high efficiency.

In this case, the ultraviolet light, which has been emitted to the ink, is absorbed by the polymerization initiator to polymerize the exothermic polymerizable substance. In this case, as the heat generated by ultraviolet irradiation, heat generated by a polymerization reaction of the exothermic polymerizable substance is added to conversion heat generated by the polymerization initiator in response to the ultraviolet light. Consequently, as described above, as compared with a case of adding to the ink only an ultraviolet light absorbent corresponding to the polymerization initiator, this configuration ensures more effective heating of the ink. Moreover, this ensures appropriate drying of the ink in a shorter time. In this case, preferably, an irradiation amount of ultraviolet light from the ultraviolet light sources 104 is larger than an energy required for polymerizing the exothermic polymerizable substance to cure, for example. This configuration ensures, for example, more reliable heating of the ink by ultraviolet irradiation.

The above description of the printing operation mainly refers to the operation until drying the ink. However, in a case of using an ink containing a dye as the colorant, for example, it is considered to perform as desired processing for developing the color of the ink. In this case, for example, a predetermined color image is printed in inks containing dyes and irradiated with ultraviolet light to fix the inks on the medium in an instant. Thus, the ink image of color dyes are formed on the surface of a medium such as fabric. In this case, as necessary, processing for developing the colors of the inks is performed. In this case, the image formed on the medium such as fabric is heated in an oven or in steam, for example, to cause the dyes to react with respect to fiber of the fabric to develop colors of the dyes. Depending on a property of an ink used in printing, it is also considered to utilize heat generated by ultraviolet irradiation to develop a color of the dye, for example.

In a case of printing in the ink B in each of the configurations described above, it is ensured that advantages are obtained over the case of using a known solvent UV ink, for example, in respects other than the respects described above. More specifically, for example, suppose printing a medium of fabric in an ink containing a dye. In this case, when printing is performed in a conventional SUV ink, for example, cured resin may remain on the medium to hinder color development of the dye. There are cases in which the resin remaining on the medium hardens the medium after color development. In contrast, in a case of printing a medium such as fabric using the ink B containing a dye, resin generated by polymerization is to be removed before completion of printing. This ensures that various disadvantageous phenomena caused by the resin remaining on the medium are appropriately prevented. In this case, preferably, the resin is removed after ultraviolet irradiation and before processing for color development of the dye. This configuration ensures more appropriate color development of the dye on the medium.

The embodiments of the present disclosure are suitably applicable to printers, for example.

What is claimed is:

1. A printer that performs printing on a medium by an inkjet scheme, and the printer comprising:
   an inkjet head, configured to eject ink droplets of an ink by the inkjet scheme, and the ink comprising a solvent to be evaporated to fix the ink on the medium; and
   an ultraviolet light source, configured to irradiate the ink with an ultraviolet light,
   wherein the ink comprises:
      a colorant, configured to develop a color of the ink,
      the solvent,
      an exothermic polymerizable substance, configured to cause a polymerization reaction to generate heat, and
      a polymerization initiator, configured to start the polymerization reaction of the exothermic polymerizable substance in response to irradiation with the ultraviolet light,
      wherein the ultraviolet light source is configured to irradiate the ink adhered to the medium with the ultraviolet light to make the exothermic polymerizable substance cause the polymerization reaction in such a manner that the solvent in the ink is evaporated by the heat generated by the polymerization reaction to such an extent that the ink does not bleed with respect to the medium or the ink does not bleed between colors of the ink,
   and the ultraviolet light source irradiates the ultraviolet ray of 200 mJ/cm$^2$ or more in 2 seconds or less after the ink is landed, and an irradiation of the ultraviolet light is controlled to an extent of without scorching the ink and the medium by the heat generated by the polymerization reaction, so as to fix the ink on the medium.

2. The printer according to claim 1, wherein
   the printer comprises a plurality of inkjet heads, configured to eject ink droplets of inks of different colors respectively, and
   the ultraviolet light source is configured to irradiate the inks with the ultraviolet light before the inks of different colors are mixed on the medium to cause ink bleeding, so as to increase viscosity of the inks at least to such a degree that substantially no ink bleeding occurs.

3. The printer according to claim 2, wherein
   the ink comprises 50 weight % or more of the solvent.

4. The printer according to claim 3, wherein
   the solvent comprises water as a main ingredient.

5. The printer according to claim 2, wherein
   the solvent comprises water as a main ingredient.

6. The printer according to claim 2, wherein
   the ultraviolet light source is configured to irradiate the ink with the ultraviolet light within such a range that the solvent in the ink is not completely evaporated.

7. The printer according to claim 1, wherein
   the ink comprises 50 weight % or more of the solvent.

8. The printer according to claim 7, wherein
   the solvent comprises water as a main ingredient.

9. The printer according to claim 7, wherein
   the ultraviolet light source is configured to irradiate the ink with the ultraviolet light within such a range that the solvent in the ink is not completely evaporated.

10. The printer according to claim 1, wherein
    the solvent comprises water as a main ingredient.

11. The printer according to claim 1, wherein
    the ultraviolet light source is configured to irradiate the ink with the ultraviolet light within such a range that the solvent in the ink is not completely evaporated.

12. The printer according to claim 11, further comprising:
    a heater, configured to heat the medium, so as to evaporate the solvent that remains in the ink after the ultraviolet light source has irradiated the ink with the ultraviolet light.

13. The printer according to claim 1, wherein
    the exothermic polymerizable substance is configured to cause the polymerization reaction to change into a resin, and
    the resin is removed after the ultraviolet light source has irradiated the ink on the medium with the ultraviolet light.

14. The printer according to claim 13, wherein
    the medium comprises fabric, and
    the resin comprises water-soluble resin and is removed by washing the medium in water.

15. The printer according to claim 1, wherein
    the inkjet head comprises a color ink head, which is an inkjet head configured to eject ink droplets of an ink of a chromatic color,
    the printer further comprising: a clear ink head other than the color ink head, and the clear ink head is an inkjet head configured to eject ink droplets of a clear ink,
    the clear ink head being configured to eject ink droplets of the clear ink on the ink that has been ejected from the color ink head and irradiated with the ultraviolet light by the ultraviolet light source, so as to form a layer of the clear ink that covers an image depicted with the ink of the chromatic color.

16. The printer according to claim 15, wherein
the clear ink head is configured to form the layer of the clear ink, so that a printed surface of the medium after printing is made glossier than in a case where the layer of the clear ink is not formed.

17. The printer according to claim 15, wherein
the exothermic polymerizable substance is configured to cause the polymerization reaction to change into resin, and
the resin remains on the medium after the ultraviolet light source has irradiated the ink on the medium with the ultraviolet light, so as to retain the colorant on the medium.

18. The printer according to claim 1, wherein
the medium comprises a medium that has undergone no pretreatment for preventing ink bleeding.

19. The printer according to claim 1, wherein
the ultraviolet light source is configured to irradiate the ink that has landed on the medium with the ultraviolet light comprising 200 mJ/cm$^2$ or more in 2 seconds or less after landing, so as to evaporate at least 50 weight % or more of the solvent in the ink.

20. A printing method that performs printing on a medium by an inkjet scheme, and the printing method comprising:
ejecting ink droplets of an ink from an inkjet head by the inkjet scheme, and the ink comprising a solvent to be evaporated to fix the ink on the medium; and
irradiating the ink with an ultraviolet light by an ultraviolet light source,
wherein the ink comprises:
a colorant, configured to develop a color of the ink,
the solvent,
an exothermic polymerizable substance, configured to cause a polymerization reaction to generate heat, and
a polymerization initiator, configured to start the polymerization reaction of the exothermic polymerizable substance in response to irradiation with the ultraviolet light,
wherein the ultraviolet light source is configured to irradiate the ink adhered to the medium with the ultraviolet light to make the exothermic polymerizable substance cause the polymerization reaction in such a manner that the solvent in the ink is evaporated by the heat generated by the polymerization reaction to such an extent that the ink does not bleed with respect to the medium or the ink does not bleed between colors of the ink,
and the ultraviolet light source irradiates the ultraviolet ray of 200 mJ/cm$^2$ or more in 2 seconds or less after the ink is landed, and an irradiation of the ultraviolet light is controlled to an extent of without scorching the ink and the medium by the heat generated by the polymerization reaction, so as to fix the ink on the medium.

* * * * *